(12) United States Patent
Wu et al.

(10) Patent No.: US 11,886,033 B2
(45) Date of Patent: *Jan. 30, 2024

(54) IMAGING LENS MODULE AND ELECTRONIC DEVICE

(71) Applicant: LARGAN PRECISION CO., LTD., Taichung (TW)

(72) Inventors: Chien-Hsun Wu, Taichung (TW); Lin-An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,614

(22) Filed: Sep. 23, 2022

(65) Prior Publication Data

US 2023/0019613 A1  Jan. 19, 2023

Related U.S. Application Data

(63) Continuation of application No. 16/780,967, filed on Feb. 4, 2020, now Pat. No. 11,500,173.

(30) Foreign Application Priority Data

Mar. 29, 2019  (TW) .................................. 108111396

(51) Int. Cl.
*G02B 7/02* (2021.01)
*G03B 17/12* (2021.01)

(52) U.S. Cl.
CPC ............. *G02B 7/022* (2013.01); *G02B 7/021* (2013.01); *G03B 17/12* (2013.01)

(58) Field of Classification Search
CPC .... G02B 7/021; G02B 13/0045; G02B 5/005; G02B 13/0015; G02B 7/02; G02B 27/0018; G02B 13/001; G02B 13/004; H04N 5/2254; G03B 17/12
See application file for complete search history.

(56) References Cited

U.S. PATENT DOCUMENTS 7,573,657 B2   8/2009   Chiang
8,786,041 B2   7/2014   Iwafuchi et al.
9,817,205 B2   11/2017  Wei et al.
(Continued)

FOREIGN PATENT DOCUMENTS

TW          201307980 A    2/2013

*Primary Examiner* — Ephrem Z Mebrahtu
(74) *Attorney, Agent, or Firm* — McClure, Qualey & Rodack, LLP

(57) ABSTRACT

An imaging lens module includes a plastic lens barrel, a first optical element assembly and a second optical element assembly, wherein both of the first optical element assembly and the second optical element assembly are disposed in the plastic lens barrel. The plastic lens barrel includes a first inner annular surface and a second inner annular surface. The first inner annular surface forms a first receiving space. The second inner annular surface forms a second receiving space. The first optical element assembly is disposed in the first receiving space and includes a plurality of optical lens elements and a first retainer. The second optical element assembly is disposed in the second receiving space and includes a first light blocking sheet and a second retainer.

20 Claims, 25 Drawing Sheets

(56) References Cited

U.S. PATENT DOCUMENTS

| | | | |
|---|---|---|---|
| 9,939,604 B2 | 4/2018 | Lamontagne et al. | |
| 10,082,649 B2 | 9/2018 | Park et al. | |
| 2012/0262805 A1* | 10/2012 | Fujii | G02B 13/001 |
| | | | 359/740 |
| 2013/0038787 A1 | 2/2013 | Lee | |
| 2016/0266373 A1* | 9/2016 | Sakai | G02B 23/2446 |
| 2017/0139175 A1* | 5/2017 | Wei | G02B 7/026 |
| 2018/0081142 A1* | 3/2018 | Sato | G02B 7/022 |
| 2020/0233176 A1* | 7/2020 | Feng | G02B 7/021 |

\* cited by examiner

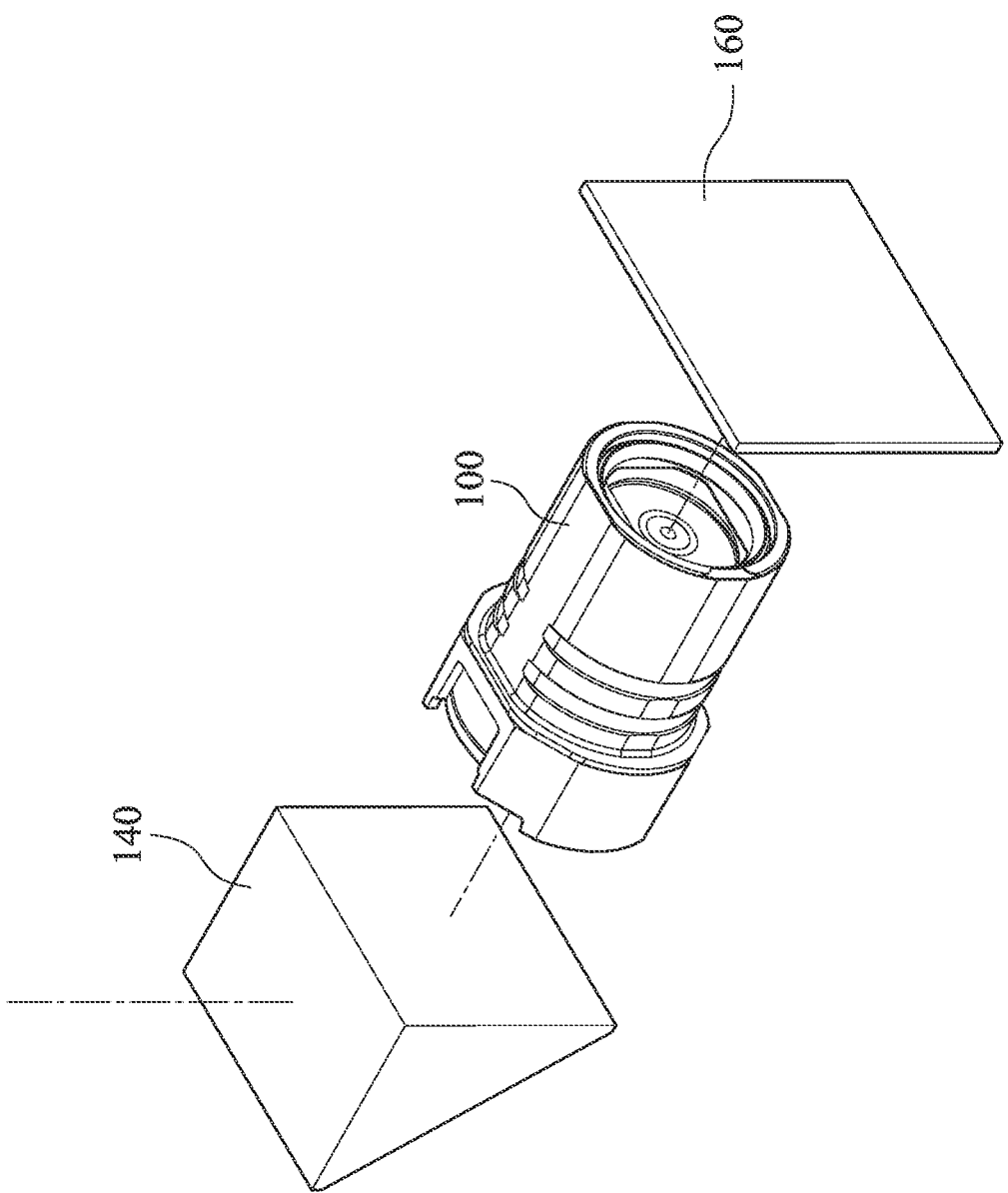

IMAGING LENS MODULE AND ELECTRONIC DEVICE

RELATED APPLICATIONS

The present application is a Continuation of U.S. application Ser. No. 16/780,967, filed on Feb. 4, 2020, issued Nov. 15, 2022, as U.S. Pat. No. 11,500,173, which claims priority to Taiwan Application Serial Number 108111396, filed Mar. 23, 2019, which are incorporated by reference herein in its entirety.

BACKGROUND

Technical Field

The present disclosure relates to an imaging lens module. More particularly, the present disclosure relates to an imaging lens module applicable to portable electronic devices.

Description of Related Art

In recent years, portable electronic devices have developed rapidly. For example, intelligent electronic devices and tablets have been filled in the lives of modern people, and imaging lens module mounted on portable electronic devices has also prospered. However, as technology advances, the quality requirements of imaging lens modules are becoming higher and higher. Therefore, in addition to the improvement in optical design, the imaging lens module needs to be improved in manufacturing precision.

SUMMARY

According to an embodiment of the present disclosure, an imaging lens module includes a plastic lens barrel, a first optical element assembly and a second optical element assembly, wherein all of the first optical element assembly and the second optical element assembly are disposed in the plastic lens barrel. The plastic lens barrel has an object-side hole facing towards an object side and an image-side hole facing towards an image side, and includes a protrusion portion, a first inner annular surface and a second inner annular surface. The protrusion portion extends towards an optical axis along a direction perpendicular to the optical axis. The first inner annular surface is connected to an object side of the protrusion portion and the object-side hole, and forms a first receiving space. The second inner annular surface is connected to an image side of the protrusion portion and the image-side hole, and forms a second receiving space. The first optical element assembly is disposed in the first receiving space, and includes a plurality of optical lens elements and a first retainer, wherein the first retainer is for positioning the first optical element assembly in the first receiving space. The second optical element assembly is disposed in the second receiving space, and includes a first light blocking sheet and a second retainer, wherein the second retainer is for positioning the second optical element assembly in the second receiving space. The protrusion portion is an annular-shaped which surrounds the optical axis and forms a central hole, and the central hole is located between the first receiving space and the second receiving space. A maximum outer diameter of the optical lens element is larger than a minimum inner diameter of the central hole, and all of the optical lens elements are located on an object side of the central hole. A minimum inner diameter of the first light blocking sheet is smaller than the minimum inner diameter of the central hole.

According to another embodiment of the present disclosure, an electronic device includes the aforementioned imaging lens module and an image sensor, and the image sensor is disposed on an image surface of the imaging lens module.

BRIEF DESCRIPTION OF THE DRAWINGS

The present disclosure can be more fully understood by reading the following detailed description of the embodiment, with reference made to the accompanying drawings as follows:

FIG. 1A is a three-dimensional schematic view of an imaging lens module according to the 1st example of the present disclosure.

FIG. 1I is a schematic view of a first light blocking sheet according to the 1st example of FIG. 1A.

DETAILED DESCRIPTION

Figure 1B:
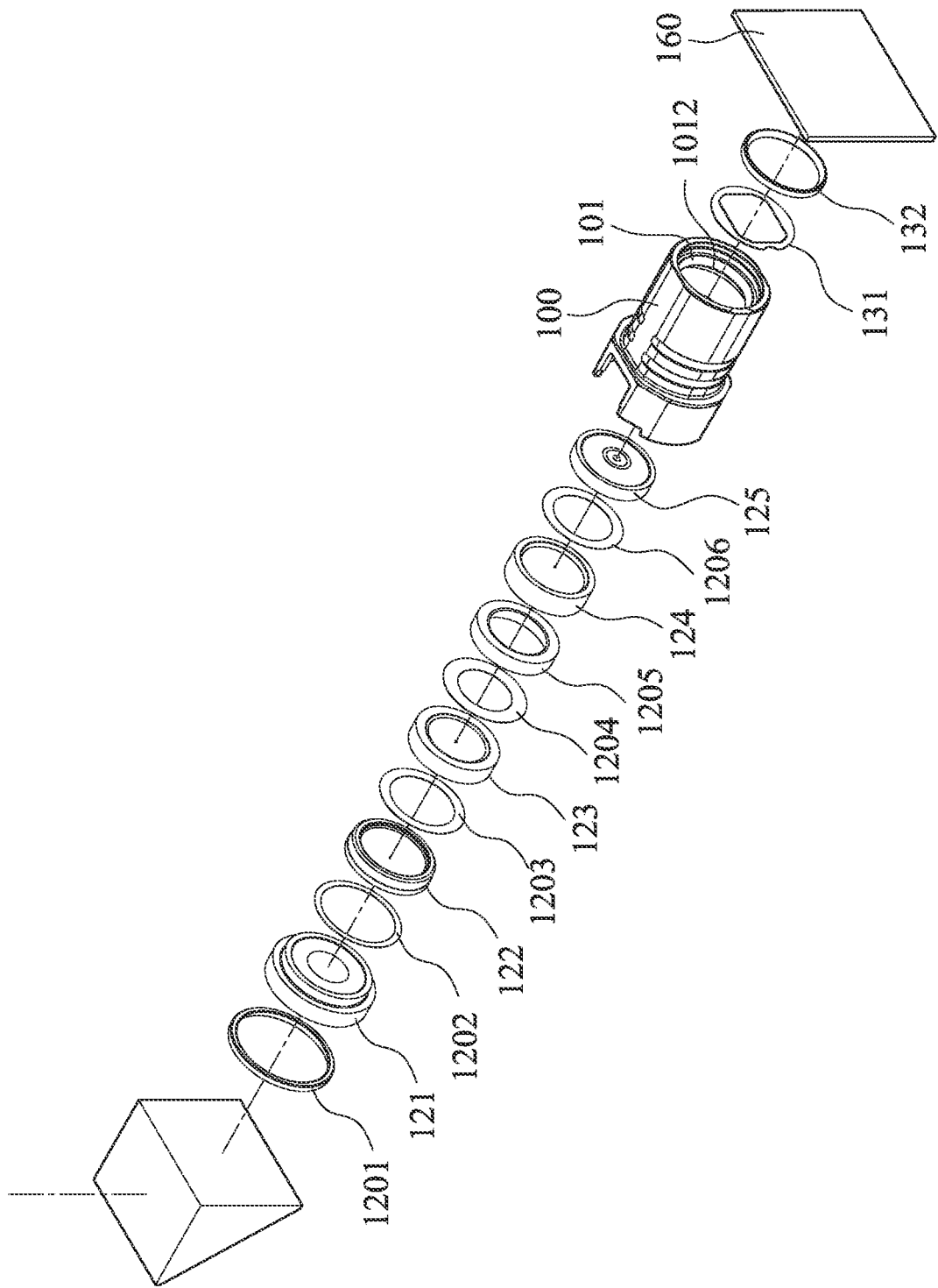
FIG. 1B is an exploded view of the imaging lens module according to the 1st example of FIG. 1A.

The present disclosure provides an imaging lens module which has an optical axis and includes a plastic lens barrel, a first optical element assembly and a second optical element assembly, wherein both of the first optical element assembly and the second optical element assembly are disposed in the plastic lens barrel. The plastic lens barrel has an object-side hole facing towards an object side and an image-side hole facing towards an image side, and includes a protrusion portion, a first inner annular surface and a second inner annular surface. The protrusion portion extends towards the optical axis along a direction perpendicular to the optical axis. The first inner annular surface is connected to an object side of the protrusion portion and the object-side hole, and forms a first receiving space. The second inner annular surface is connected to an image side of the protrusion portion and the image-side hole, and forms a second receiving space. The first optical element assembly is disposed in the first receiving space, and includes a plurality of optical lens elements and a first retainer, wherein the first retainer is for positioning the first optical element assembly in the first receiving space. The second optical element assembly is disposed in the second receiving space, and includes a first light blocking sheet and a second retainer, wherein the second retainer is for positioning the second optical element assembly in the second receiving space. The protrusion portion is an annular-shaped which surrounds the optical axis and forms a central hole, and the central hole is located between the first receiving space and the second receiving space. A maximum outer diameter of the optical lens element is larger than a minimum inner diameter of the central hole, and all of the optical lens elements are located on an object side of the central hole. A minimum inner diameter of the first light blocking sheet is smaller than the minimum inner diameter of the central hole.

According to the arrangement of the above imaging lens module, it is favorable for arranging two independent spaces to contain the optical elements in the plastic lens barrel, which are for optical imaging and blocking the stray light, respectively, so as to enhance the image quality. By arranging the first light blocking sheet close to an image surface, it is favorable for reducing the probability of the additional stray light on the image side. It should be mentioned that the arrangement of the light blocking sheet or the light blocking element can be adjusted on demand in the second optical element assembly. It can be arranged as an optical element without refractive power which does not affect the conditions of the optical imaging, and can adaptably achieve better light blocking efficiency; that is, by the above arrangement, the imaging quality can be achieved via adjusting only one side of the arrangement of the optical element, so as to improve the product manufacturing yield. Further, in the assembly, the arrangement of two receiving spaces can be achieved through technology of two-way assembly, and improves the stability of the inner elements.

The minimum inner diameter of the central hole can be smaller than a diameter of the object-side hole of the plastic lens barrel, and the minimum inner diameter of the central hole can be smaller than a diameter of the image-side hole of the plastic lens barrel. Therefore, the central hole can be the minimum hole of the plastic lens barrel, and provides the manufacturability of the injection molding of the plastic lens barrel and the feasibility of two-way assembling of the optical elements.

An outer diameter of the first receiving space is gradually reduced from the object-side hole to the central hole along the optical axis, and an outer diameter of the second receiving space is gradually reduced from the image-side hole to the central hole along the optical axis. Therefore, it is favorable for the plastic lens barrel to improve the success rate of mold release during the injection molding, and increase the success rate of injection molded products and the quantity of products.

The imaging lens module can further include an image surface which is located on an image side of the plastic lens barrel, and an image sensor disposed thereon, wherein the first light blocking sheet has an inner hole, the inner hole includes a circular portion and a rectangular portion, the circular portion corresponds to a shape of the central hole, and the rectangular portion corresponds to a shape of the image sensor. Therefore, the efficiency of blocking the unnecessary light outside the image sensor is increased to obtain the better image quality.

The first light blocking sheet can include a directional notch, the plastic lens barrel further includes a directional protrusion, the directional notch corresponds to the directional protrusion and cooperates with each other, and the directional notch and the directional protrusion extend towards the optical axis. Therefore, the positioning ability of the assembling of the light blocking sheet is provided, and the specific beam is effectively shielded from the light blocking sheet. It can further improve the efficiency of the product assembling, and increase output and yield of the product.

The second optical element assembly can further include a second light blocking sheet and a first spacer, the first spacer is adjacent to an image side of the first light blocking sheet, and the second light blocking sheet is adjacent to an image side of the first spacer. Therefore, the image side of the imaging lens module are arranged more non-imaging optical elements, and high concentricity tolerances can be tolerated in assembling.

The second optical element assembly can further include a third light blocking sheet and a second spacer, the second spacer is adjacent to an image side of the second light blocking sheet, and the third light blocking sheet is adjacent to an image side of the second spacer. Therefore, the image side of the imaging lens module are further arranged more non-imaging optical elements, and high concentricity tolerances can be tolerated in assembling.

The second optical element assembly includes at least two light blocking sheets; in detail, it can be three light blocking sheets which are a first light blocking sheet, a second light blocking sheet, and a third light blocking sheet, wherein a minimum inner diameter of one of the first light blocking sheet, the second light blocking sheet and the third light blocking sheet which is closer to the image side is larger than which is closer to the object side. Therefore, it is favorable for improving light blocking efficiency and maintaining good optical specifications.

The protrusion portion can include a reverse inclined surface, and the reverse inclined surface is a conical surface which is gradually enlarged from the central hole toward the image side. Therefore, it is favorable for improving the efficiency of shielding non-imaged light, so as to achieve better image quality and maintain the feasibility of molding.

The second retainer has an inner annular surface, and an inner diameter of the inner annular surface is gradually enlarged from the object side toward the image side. Therefore, it is favorable for effectively reducing the probability of generating stray light.

The imaging lens module can further include a first receiving groove and a second receiving groove. The first receiving groove is disposed between the plastic lens barrel and the first retainer. The second receiving groove is disposed between the plastic lens barrel and the second retainer. Each of the first receiving groove and the second receiving groove is filled with a glue material for positioning the first retainer and the second retainer in the plastic lens barrel, respectively. Therefore, it is favorable for improving the structural stability of the imaging lens module through two-way manufacturing technology, so as to reduce the probability of the optical element changing spacing which is produced by the impact.

When a length of the first inner annular surface along the optical axis is L1, and a length of the second inner annular surface along the optical axis is L2, the following condition is satisfied: $0.05<L2/L1<0.50$. Therefore, the sizes of two receiving spaces are within the preferred range of the plastic lens barrel molding, which can reduce the probability of dents and warpage during the plastic lens barrel molding.

When a shortest distance between the first retainer and the second retainer along the optical axis is D1, the following condition is satisfied: $3.5\ mm<D1<8.0\ mm$. By arranging a retainer on both sides of the plastic lens barrel, the optical elements can be prevented from falling off, and the two-way assembly technology is provided.

When a shortest distance between the optical lens element closest to the image-side hole in the first optical element assembly and a light blocking sheet adjacent to the second retainer in the second optical element assembly along the optical axis is D2, the following condition is satisfied: $0.2\ mm<D2<2.0\ mm$. Therefore, the light blocking sheet is arranged to be closer to the image surface, it is favorable for effectively improving the high-intensity stray light which appears in the field of view when photographing.

When a number of the optical lens is N, the following condition is satisfied: $4 \leq N<10$. Therefore, a high resolution of the imaging lens module can be provided.

A composite focal length of the plurality of optical lens elements is equal to an effective focal length of the imaging lens module. Therefore, it is favorable for reducing tolerances during assembling and maintaining optical imaging quality by arranging all of the optical lens elements on one side of the plastic lens barrel. Moreover, due to the arrangement of the optical lens elements, the imaging lens module can be a telephoto lens assembly and cooperated with the aforementioned light blocking structure, so that it is favorable for more effectively blocking stray light close to the image surface, and providing better image quality.

The imaging lens module can further include an optical-path folding element which is disposed on the object side of the imaging lens module. Therefore, the feasibility of a telephoto lens assembly applied to thin electronic devices is provided. In detail, the optical-path folding element can be a structure such as a prism or a reflector, which can convert the incident light into the plastic lens barrel, but it is not limited thereto. Moreover, the imaging lens module further includes another optical-path folding element which can be disposed on the image side of the imaging lens module for turning the imaging light into the image sensor.

Each of the aforementioned features of the imaging lens module can be utilized in various combinations for achieving the corresponding effects According to another embodiment of the present disclosure, an electronic device includes the aforementioned imaging lens module and an image sensor, and the image sensor is disposed on an image surface of the imaging lens module. Therefore, an electronic device which is miniaturized and has better image quality is provided.

1ST EXAMPLE

Figure 1C:
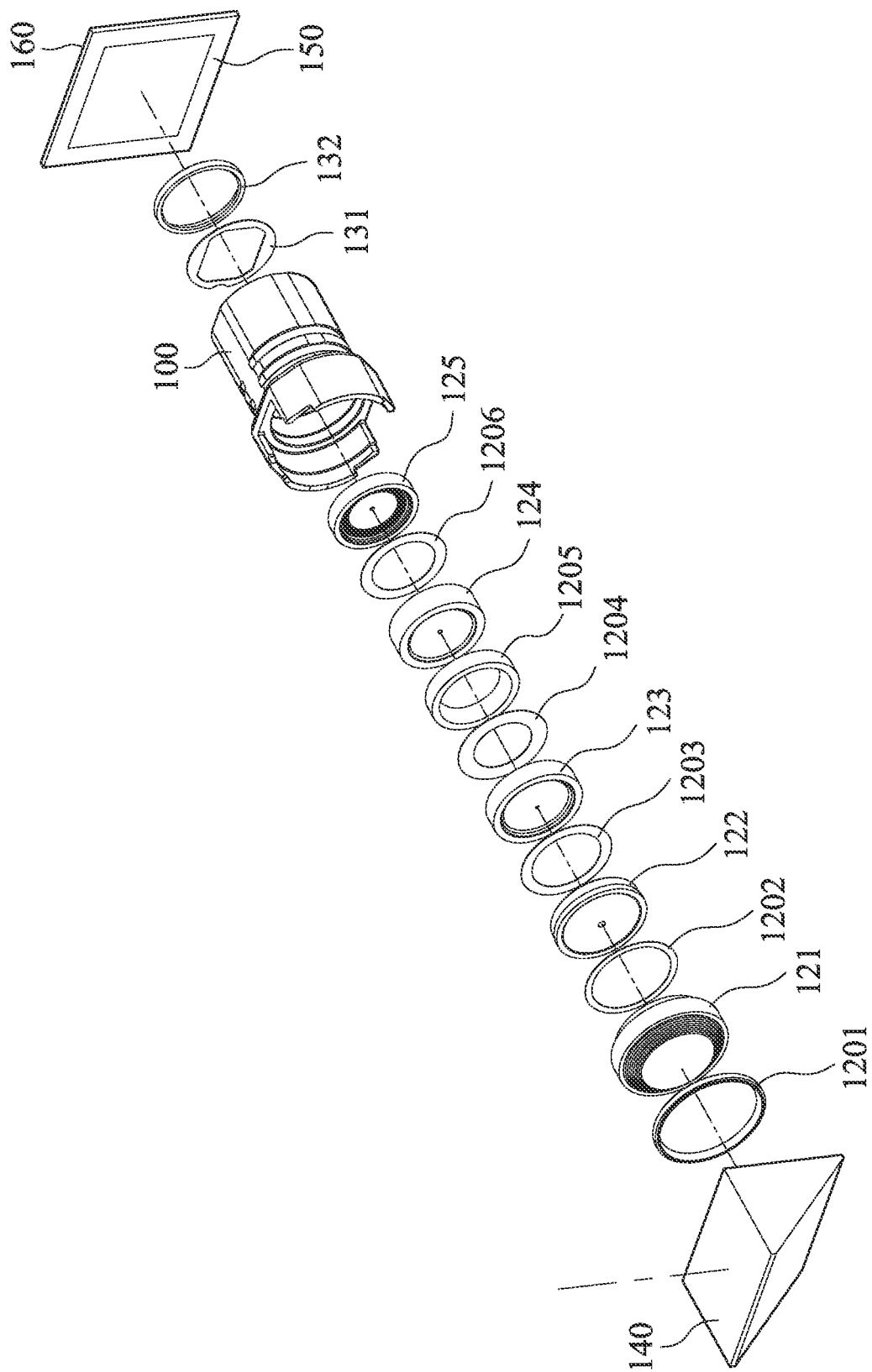
FIG. 1C is another exploded view of the imaging lens module according to the 1st example of FIG. 1A.

FIG. 1A is a three-dimensional schematic view of an imaging lens module according to the 1st example of the present disclosure. FIG. 1B is an exploded view of the imaging lens module according to the 1st example of FIG. 1A. FIG. 1C is another exploded view of the imaging lens module according to the 1st example of FIG. 1A. In FIGS. 1A, 1B and 1C, an imaging lens module has an optical axis X. The imaging lens module includes, in order from an object side to an image side, an optical-path folding element 140, a plastic lens barrel 100 and an image surface 150, wherein the optical-path folding element 140 and the image surface 150 are located on an object side and an image side of the plastic lens barrel 100 along the optical axis X, respectively. An image sensor 160 can be disposed on the image surface 150.

The imaging lens module can further include a first optical element assembly (its reference numeral is omitted) and a second optical element assembly (its reference numeral is omitted). The first optical element assembly and the second optical element assembly are disposed in the plastic lens barrel 100, respectively. In FIGS. 1B and 1C, the first optical element assembly includes a plurality of optical lens elements 121, 122, 123, 124, 125 and a first retainer 1201. In the 1st example, the first optical element assembly further includes a plurality of optical elements 1202, 1203, 1204, 1205, 1206, wherein each of the optical elements 1202, 1203, 1204, 1206 is a light blocking sheet, and the optical element 1205 is a spacer. The first retainer 1201 is for positioning the first optical element assembly in the plastic lens barrel 100; in detail, the first retainer 1201 is located on the object side of the first optical element assembly for positioning the optical lens elements 121, 122, 123, 124, 125 and the optical elements 1202, 1203, 1204, 1205, 1206 in the plastic lens barrel 100. The second optical element assembly includes a first light blocking sheet 131 and a second retainer 132, wherein the second retainer 132 is for positioning the second optical element assembly in the plastic lens barrel 100; in detail, the second retainer 132 is located on the image side of the second optical element assembly for positioning the first light blocking sheet 131 in the plastic lens barrel 100.

Figure 1D:
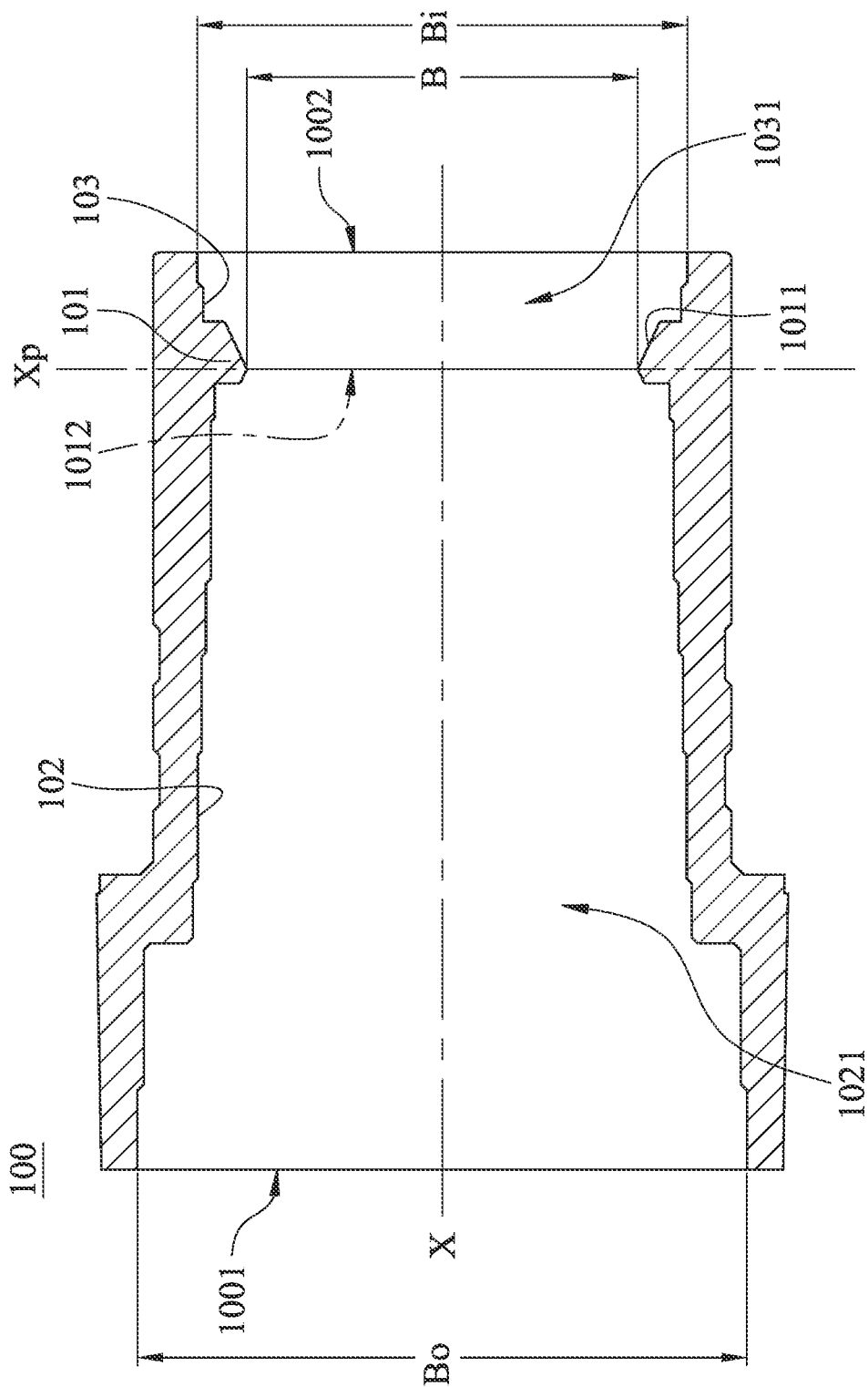
FIG. 1D is a schematic view of the plastic lens barrel according to the 1st example of FIG. 1A.

FIG. 1D is a schematic view of the plastic lens barrel 100 according to the 1st example of FIG. 1A. In FIG. 1D, the plastic lens barrel 100 has an object-side hole 1001 facing towards an object side and an image-side hole 1002 facing towards an image side, and includes a protrusion portion 101, a first inner annular surface 102 and a second inner annular surface 103. The protrusion portion 101 extends towards the optical axis X along a direction Xp perpendicular to the optical axis X. The first inner annular surface 102 is connected to an object side of the protrusion portion 101 and the object-side hole 1001, and forms a first receiving space 1021. The second inner annular surface 103 is connected to an image side of the protrusion portion 101 and the image-side hole 1002, and forms a second receiving space 1031.

Figure 1E:
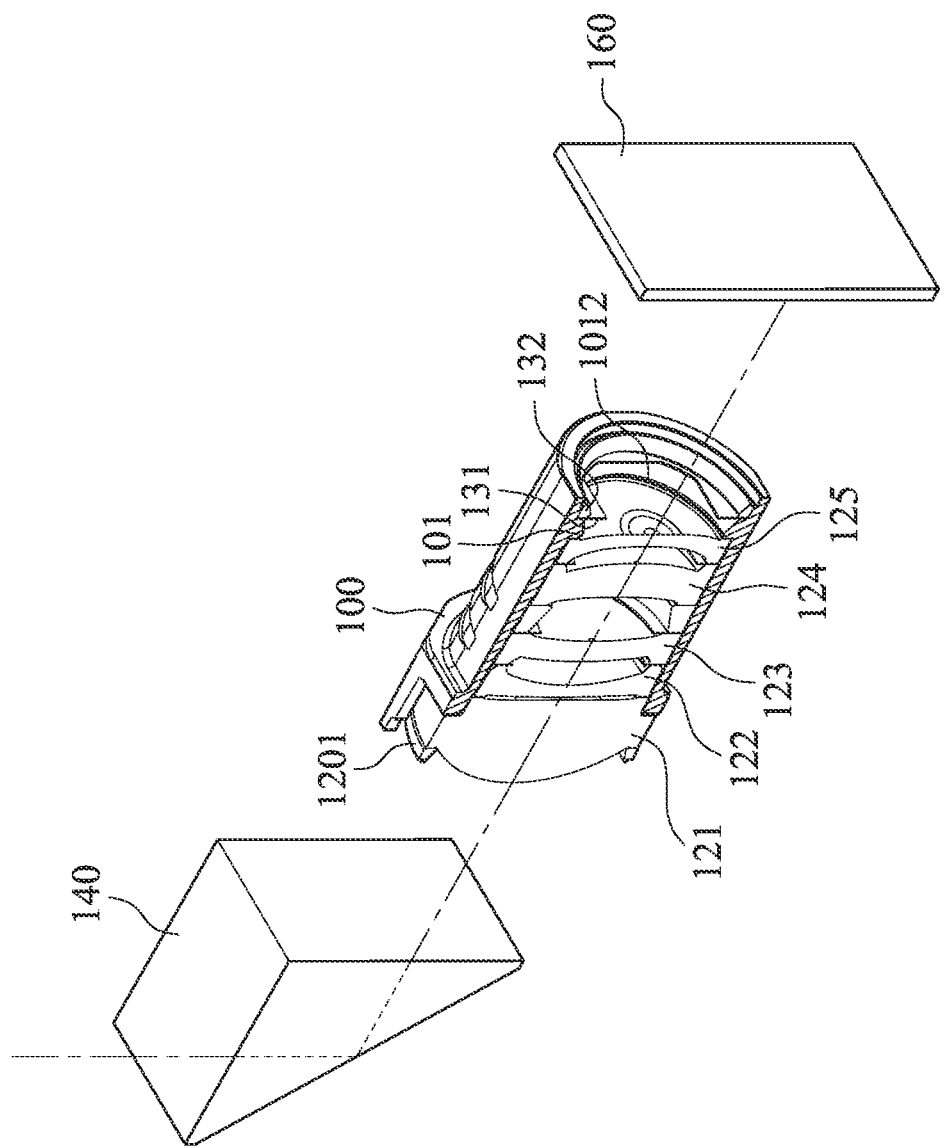
FIG. 1E is a cross-sectional view of the plastic lens barrel, a first optical element assembly and a second optical element assembly according to the 1st example of FIG. 1A.
Figure 1F:
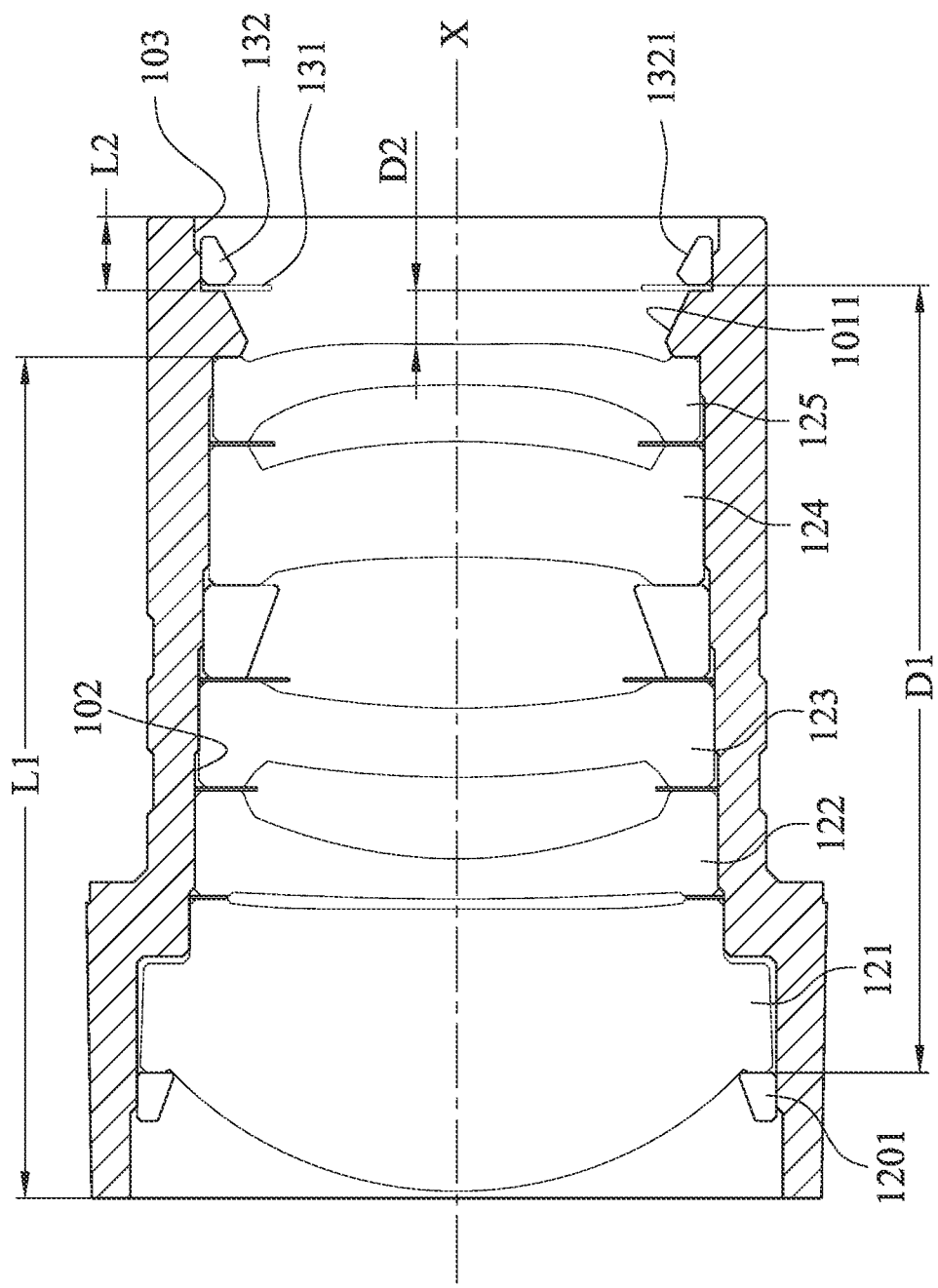
FIG. 1F is a schematic view of the plastic lens barrel, the first optical element assembly and the second optical element assembly according to the 1st example of FIG. 1A.

FIG. 1E is a cross-sectional view of the plastic lens barrel 100, the first optical element assembly and the second optical element assembly according to the 1st example of FIG. 1A. FIG. 1F is a schematic view of the plastic lens barrel 100, the first optical element assembly and the second optical element assembly according to the 1st example of FIG. 1A. FIG. 1G is a schematic view of the object side of the plastic lens barrel 100 according to the 1st example of FIG. 1A. In FIGS. 1D, 1E and 1F, the first optical element assembly is disposed in the first receiving space 1021 of the plastic lens barrel 100, and the second optical element assembly is disposed in the second receiving space 1031 of the plastic lens barrel 100; in particular, the first retainer 1201 is for positioning the first optical element assembly in the first receiving space 1021, and the second retainer 132 is for positioning the second optical element assembly in the second receiving space 1031.

In FIGS. 1D and 1F, the protrusion portion 101 is an annular-shaped which surrounds the optical axis X and forms a central hole 1012, and the central hole 1012 is located between the first receiving space 1021 and the second receiving space 1031. The protrusion portion 101 includes a reverse inclined surface 1011, and the reverse inclined surface 1011 is a conical surface which is gradually enlarged from the central hole 1012 toward the image side. The second retainer 132 has an inner annular surface 1321, and an inner diameter of the inner annular surface 1321 is gradually enlarged from the object side toward the image side.

In FIGS. 1D and 1F, a maximum outer diameter of each of the optical lens elements 121, 122, 123, 124, 125 is larger than a minimum inner diameter of the central hole 1012, and all of the optical lens elements 121, 122, 123, 124, 125 are located on an object side of the central hole 1012. Moreover, the diameter of the central hole 1012 is smaller than a diameter of the object-side hole 1001 of the plastic lens barrel 100, and the diameter of the central hole 1012 is smaller than a diameter of the image-side hole 1002 of the plastic lens barrel 100. In particular, according to the 1st example of FIG. 1D, a minimum inner diameter of the central hole 1012 is B, and B=3.110 mm. The diameter of the object-side hole 1001 of the plastic lens barrel 100 is Bo, and Bo=4.850 mm. The diameter of the image-side hole 1002 of the plastic lens barrel 100 is Bi, and Bi=3.900 mm.

In FIGS. 1D and 1G, an outer diameter of the first receiving space 1021 is gradually reduced from the object-side hole 1001 to the central hole 1012 along the optical axis X, and an outer diameter of the second receiving space 1031 is gradually reduced from the image-side hole 1002 to the central hole 1012 along the optical axis X.

Figure 1H:
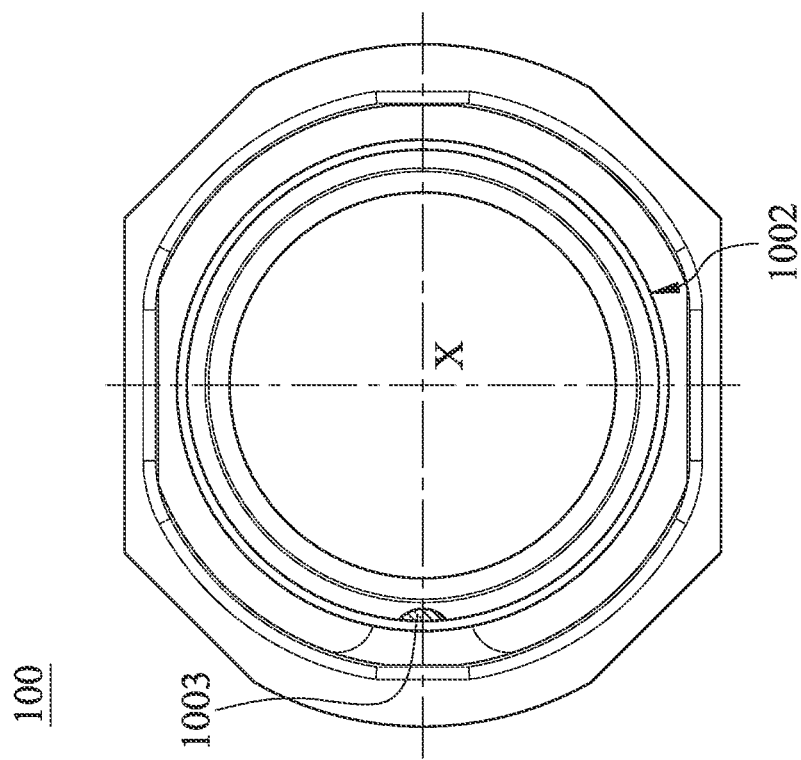
FIG. 1H is a schematic view of an image side of the plastic lens barrel according to the 1st example of FIG. 1A.
Figure 1G:
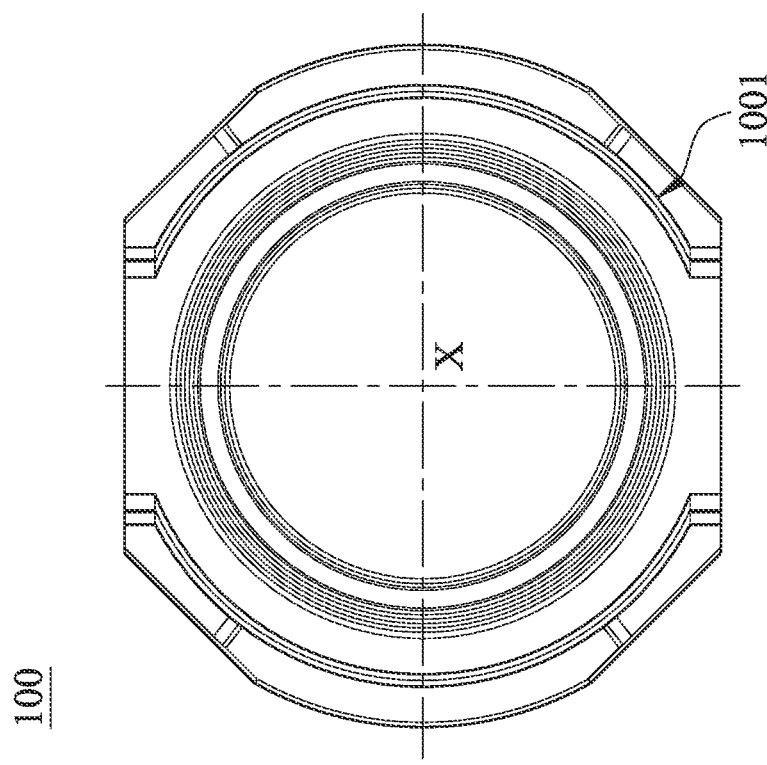
FIG. 1G is a schematic view of an object side of the plastic lens barrel according to the 1st example of FIG. 1A.
Figure 11:
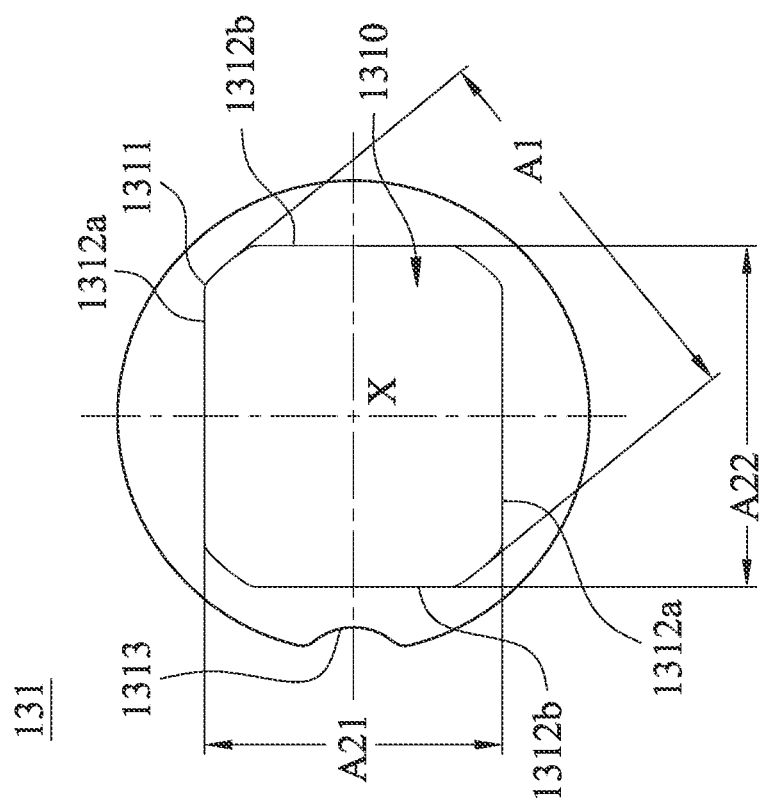

FIG. 1H is a schematic view of the image side of the plastic lens barrel 100 according to the 1st example of FIG. 1A. FIG. 1I is a schematic view of the first light blocking sheet 131 according to the 1st example of FIG. 1A. In FIGS. 1H and 1I, the first light blocking sheet 131 can include a directional notch 1313, the plastic lens barrel 100 can further include a directional protrusion 1003, the directional notch 1313 corresponds to the directional protrusion 1003 and cooperates with each other, and the directional notch 1313 and the directional protrusion 1003 extend towards the optical axis X.

In FIG. 1I, the first light blocking sheet 131 has an inner hole 1310, and the inner hole 1310 includes a circular portion 1311 and rectangular portions 1312a, 1312b. The circular portion 1311 corresponds to a shape of the central hole 1012, and the rectangular portions 1312a, 1312b correspond to a shape of the image sensor 160. In particular, according to the 1st example, a distance between the two circular portions 1311 relative to each other is A1, A1=3.200 mm, a distance between the two rectangular portions 1312a relative to each other is A21, A21=2.400 mm, and a distance between the two rectangular portions 1312b relative to each other is A22, A22=2.750 mm, wherein a minimum inner diameter of the first light blocking sheet 131 is the distance A21 between the two rectangular portions 1312a relative to each other, the minimum inner diameter of the first light blocking sheet 131 is smaller than the minimum inner diameter of the central hole 1012 (that is, A21 is smaller than B).

In FIG. 1F, when a length of the first inner annular surface 102 along the optical axis X is L1, a length of the second inner annular surface 103 along the optical axis X is L2, a shortest distance between the first retainer 1201 and the second retainer 132 along the optical axis X is D1, a shortest distance between the optical lens element 125 closest to the image-side hole in the first optical element assembly and the light blocking sheet (that is the first light blocking sheet 131) adjacent to the second retainer 132 in the second optical element assembly along the optical axis X is D2, and a number of the optical lens elements 121, 122, 123, 124, 125 is N, the following conditions of Table 1 are satisfied, respectively.

TABLE 1

| the 1st example | | | |
|---|---|---|---|
| L1 (mm) | 6.258 | D1 (mm) | 5.857 |
| L2 (mm) | 0.547 | D2 (mm) | 0.400 |
| L2/L1 | 0.087 | N | 5 |

Moreover, in the 1st example, when a composite focal length of the optical lens elements 121, 122, 123, 124, 125 is fc, fc=14.46 mm, and when an effective focal length of the imaging lens module is f, f=14.46 mm. Furthermore, in the following examples, the composite focal length of the optical lens elements and the effective focal length of the imaging lens module are the same as the 1st example, and will not be described again.

2ND EXAMPLE

Figure 2A:
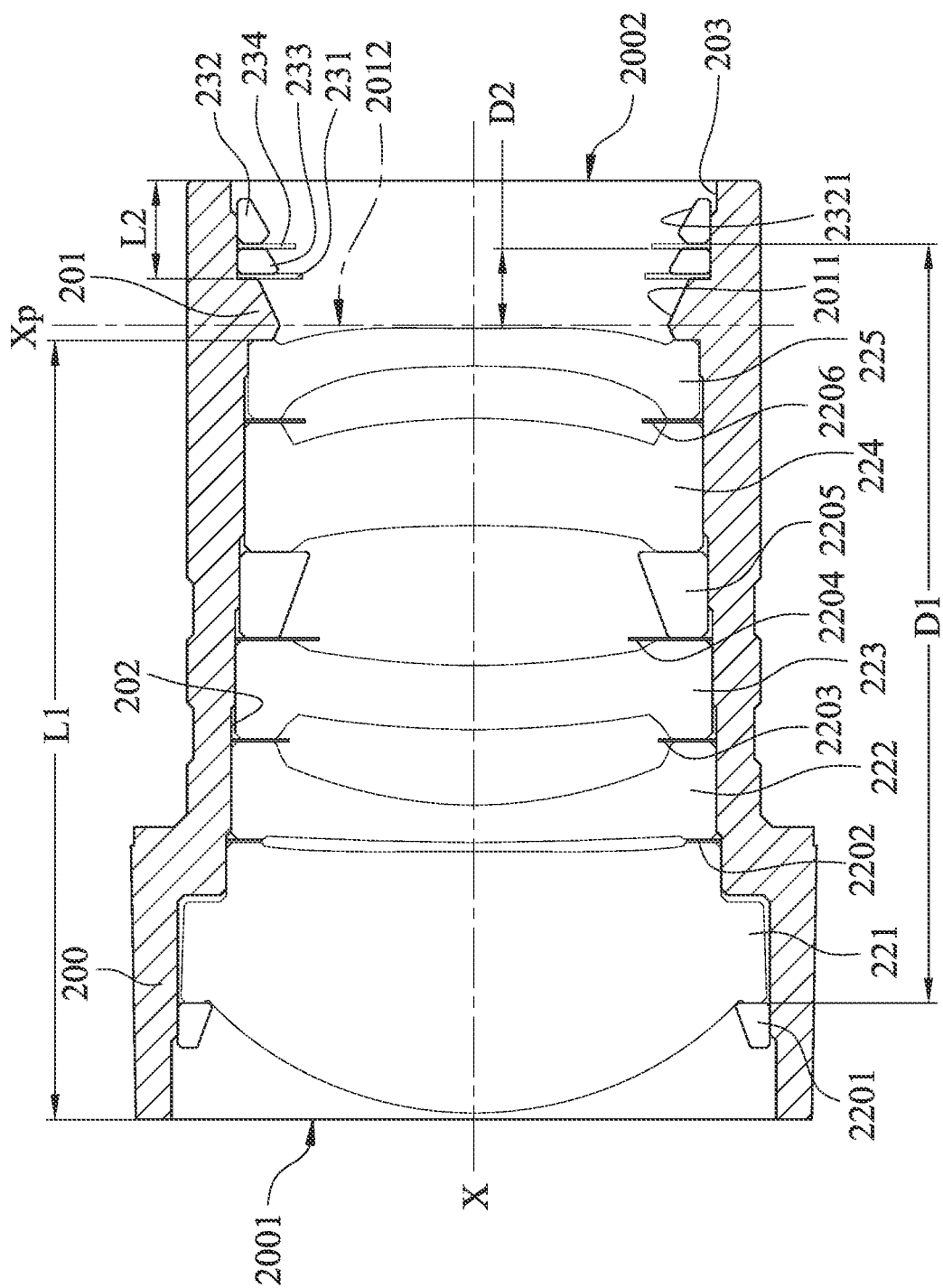
FIG. 2A is a schematic view of a plastic lens barrel, a first optical element assembly and a second optical element assembly of an imaging lens module according to the 2nd example of the present disclosure.

FIG. 2A is a schematic view of a plastic lens barrel 200, a first optical element assembly and a second optical element assembly of an imaging lens module according to the 2nd example of the present disclosure. In FIG. 2A, the imaging lens module includes the plastic lens barrel 200, the first optical element assembly (its reference numeral is omitted) and the second optical element assembly (its reference numeral is omitted), wherein all of the first optical element assembly and the second optical element assembly are disposed in the plastic lens barrel 200.

In detail, the first optical element assembly includes a plurality of optical lens elements 221, 222, 223, 224, 225 and a first retainer 2201. In the 2nd example, the first optical element assembly further includes a plurality of optical elements 2202, 2203, 2204, 2205, 2206, wherein each of the optical elements 2202, 2203, 2204, 2206 is a light blocking sheet, and the optical element 2205 is a spacer. The first retainer 2201 is for positioning the first optical element assembly in the plastic lens barrel 200; in detail, the first retainer 2201 is located on the object side of the first optical element assembly for positioning the optical lens elements 221, 222, 223, 224, 225 and the optical elements 2202, 2203, 2204, 2205, 2206 in the plastic lens barrel 200.

The second optical element assembly includes a first light blocking sheet 231, a first spacer 233, a second light blocking sheet 234 and a second retainer 232, wherein the first spacer 233 is adjacent to an image side of the first light blocking sheet 231, and the second light blocking sheet 234 is adjacent to an image side of the first spacer 233 and is adjacent to an object side of the second retainer 232. The second retainer 232 is for positioning the second optical element assembly in the plastic lens barrel 200; in detail, the second retainer 232 is located on the image side of the second optical element assembly for positioning the first light blocking sheet 231, the first spacer 233 and the second light blocking sheet 234 in the plastic lens barrel 200.

The plastic lens barrel 200 has an object-side hole 2001 facing towards an object side and an image-side hole 2002 facing towards an image side, and includes a protrusion portion 201, a first inner annular surface 202 and a second inner annular surface 203. The protrusion portion 201 extends towards the optical axis X along a direction Xp perpendicular to the optical axis X. The first inner annular surface 202 is connected to an object side of the protrusion portion 201 and the object-side hole 2001, and forms a first receiving space (its reference numeral is omitted). The second inner annular surface 203 is connected to an image side of the protrusion portion 201 and the image-side hole 2002, and forms a second receiving space (its reference numeral is omitted). The first optical element assembly is disposed in the first receiving space of the plastic lens barrel 200, and the second optical element assembly is disposed in the second receiving space of the plastic lens barrel 200; in particular, the first retainer 2201 is for positioning the first optical element assembly in the first receiving space, and the second retainer 232 is for positioning the second optical element assembly in the second receiving space.

The protrusion portion 201 is an annular-shaped which surrounds the optical axis X and forms a central hole 2012, and the central hole 2012 is located between the first receiving space and the second receiving space. The protrusion portion 201 includes a reverse inclined surface 2011, and the reverse inclined surface 2011 is a conical surface which is gradually enlarged from the central hole 2012 toward the image side. The second retainer 232 has an inner annular surface 2321, and an inner diameter of the inner annular surface 2321 is gradually enlarged from the object side toward the image side.

A maximum outer diameter of each of the optical lens elements 221, 222, 223, 224, 225 is larger than a minimum inner diameter of the central hole 2012, and all of the optical lens elements 221, 222, 223, 224, 225 are located on an object side of the central hole 2012. Moreover, the diameter of the central hole 2012 is smaller than a diameter of the object-side hole 2001 of the plastic lens barrel 200, and the diameter of the central hole 2012 is smaller than a diameter of the image-side hole 2002 of the plastic lens barrel 200.

An outer diameter of the first receiving space is gradually reduced from the object-side hole 2001 to the central hole 2012 along the optical axis X, and an outer diameter of the second receiving space is gradually reduced from the image-side hole 2002 to the central hole 2012 along the optical axis X.

Figure 2C:
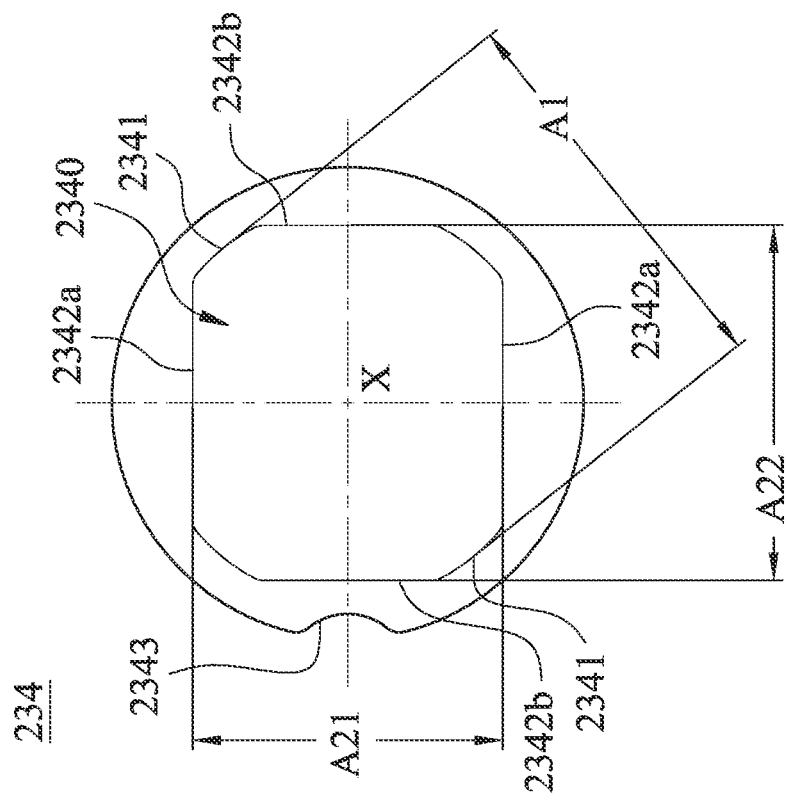
FIG. 2C is a schematic view of a second light blocking sheet according to the 2nd example of FIG. 2A.
Figure 2B:
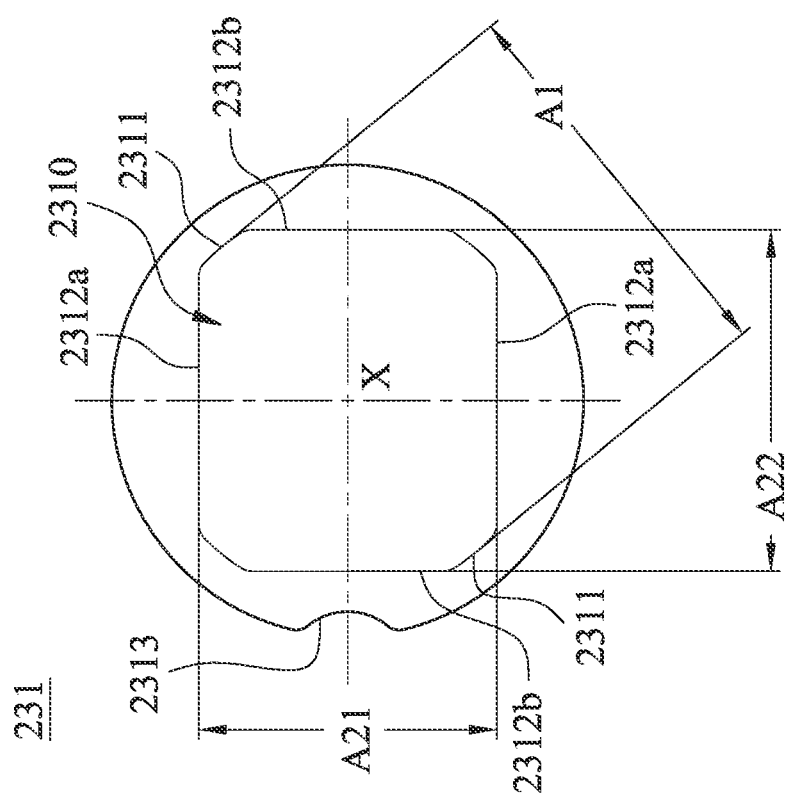
FIG. 2B is a schematic view of a first light blocking sheet according to the 2nd example of FIG. 2A.

FIG. 2B is a schematic view of the first light blocking sheet 231 according to the 2nd example of FIG. 2A. FIG. 2C is a schematic view of a second light blocking sheet 234 according to the 2nd example of FIG. 2A. In FIGS. 2B and 2C, the first light blocking sheet 231 can include a directional notch 2313, the second light blocking sheet 234 can include a directional notch 2343, the plastic lens barrel 200 can further include a directional protrusion (not shown), the directional notches 2313, 2343 correspond to the directional protrusion and cooperate with each other, and the directional notch 2313, 2343 and the directional protrusion extend towards the optical axis X.

In FIG. 2B, the first light blocking sheet 231 has an inner hole 2310, and the inner hole 2310 includes a circular portion 2311 and rectangular portions 2312a, 2312b. The circular portion 2311 corresponds to a shape of the central hole 2012, and the rectangular portions 2312a, 2312b correspond to a shape of an image sensor (not shown). In particular, according to the 2nd example, a distance between the two circular portions 2311 relative to each other is A1, A1=3.200 mm, a distance between the two rectangular portions 2312a relative to each other is A21, A21=2.400 mm, and a distance between the two rectangular portions 2312b relative to each other is A22, A22=2.750 mm, wherein a minimum inner diameter of the first light blocking sheet 231 is the distance A21 relative two rectangular portions 2312a, the minimum inner diameter of the first light blocking sheet 231 is smaller than the minimum inner diameter of the central hole 2012.

In FIG. 2C, the second light blocking sheet 234 has an inner hole 2340, and the inner hole 2340 includes a circular portion 2341 and rectangular portions 2342a, 2342b. The circular portion 2341 corresponds to a shape of the central hole 2012, and the rectangular portions 2342a, 2342b correspond to a shape of the image sensor. In particular, according to the 2nd example, a distance between the two circular portions 2341 relative to each other is A1, A1=3.200 mm, a distance between the two rectangular portions 2342a relative to each other is A21, A21=2.496 mm, and a distance between the two rectangular portions 2342b relative to each other is A22, A22=2.860 mm, wherein a minimum inner diameter of the second light blocking sheet 234 is the distance A21 relative two rectangular portions 2342a, the minimum inner diameter of the second light blocking sheet 234 is smaller than the minimum inner diameter of the central hole 2012.

In FIG. 2A, when a length of the first inner annular surface 202 along the optical axis X is L1, a length of the second inner annular surface 203 along the optical axis X is L2, a shortest distance between the first retainer 2201 and the second retainer 232 along the optical axis X is D1, a shortest distance between the optical lens element 225 closest to the image-side hole in the first optical element assembly and the light blocking sheet (that is the second light blocking sheet 234) adjacent to the second retainer 232 in the second optical element assembly along the optical axis X is D2, and a number of the optical lens elements is N, the following conditions of Table 2 are satisfied, respectively.

TABLE 2

| | the 2nd example | | |
|---|---|---|---|
| L1 (mm) | 6.258 | D1 (mm) | 6.097 |
| L2 (mm) | 0.787 | D2 (mm) | 0.640 |
| L2/L1 | 0.126 | N | 5 |

Moreover, in the imaging lens module of the 2nd example, it can further include a light turning element (not shown) and an image surface (not shown). The arrangement can be the same as the light turning element 140 and the image surface 150 disclosed in the 1st example of FIG. 1A, and the image surface is also provided with the image sensor disposed thereon, and will not be described again.

3RD EXAMPLE

Figure 3A:
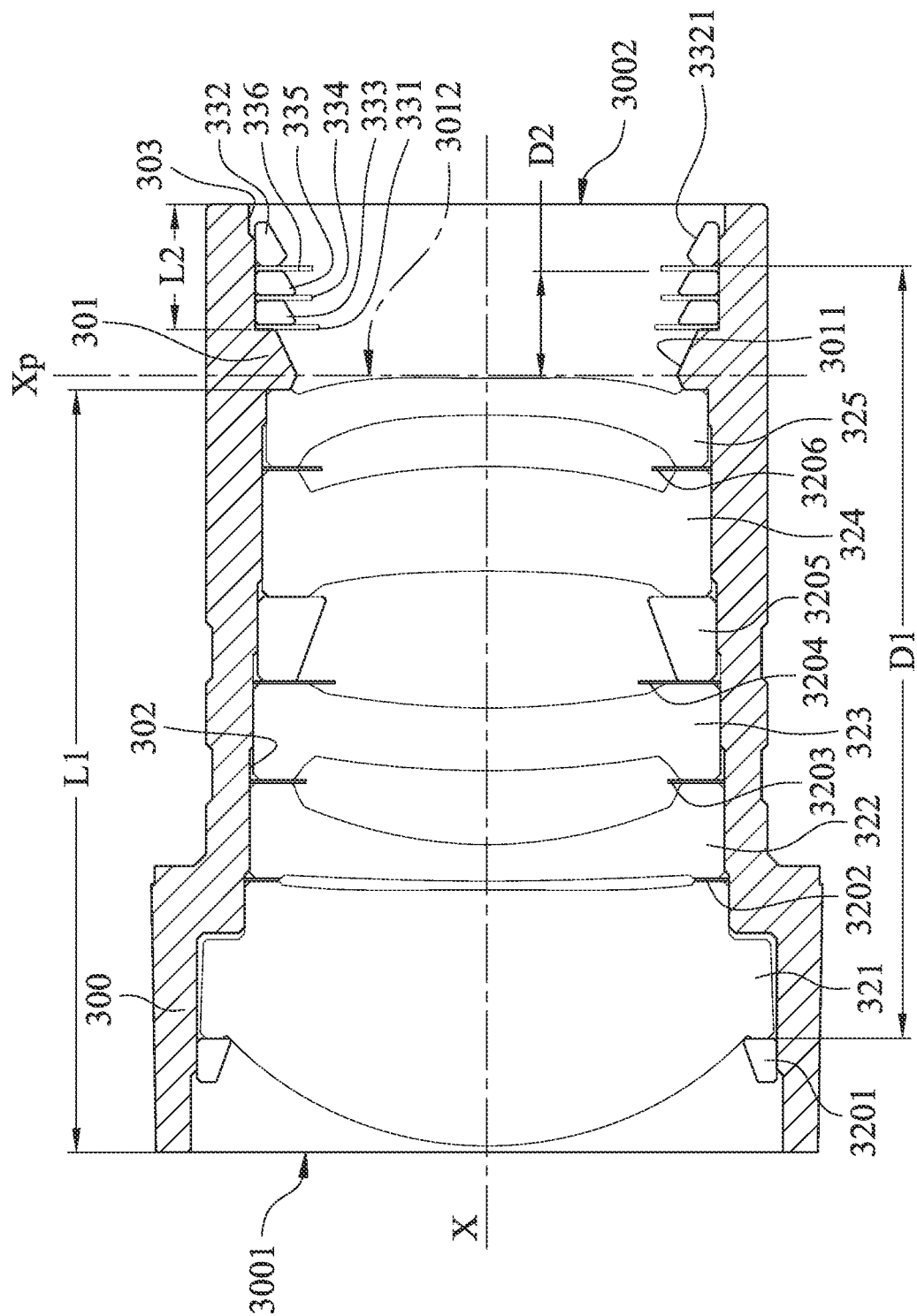
FIG. 3A is a schematic view of a plastic lens barrel, a first optical element assembly and a second optical element assembly of an imaging lens module according to the 3rd example of the present disclosure.

FIG. 3A is a schematic view of a plastic lens barrel 300, a first optical element assembly and a second optical element assembly of an imaging lens module according to the 3rd example of the present disclosure. In FIG. 3A, the imaging lens module includes the plastic lens barrel 300, the first optical element assembly (its reference numeral is omitted) and the second optical element assembly (its reference numeral is omitted), wherein all of the first optical element assembly and the second optical element assembly are disposed in the plastic lens barrel 300.

In detail, the first optical element assembly includes a plurality of optical lens elements 321, 322, 323, 324, 325 and a first retainer 3201. In the 3rd example, the first optical element assembly further includes a plurality of optical elements 3202, 3203, 3204, 3205, 3206, wherein each of the optical elements 3202, 3203, 3204, 3206 is a light blocking sheet, and the optical element 3205 is a spacer. The first retainer 3201 is for positioning the first optical element assembly in the plastic lens barrel 300; in detail, the first retainer 3201 is located on the object side of the first optical element assembly for positioning the optical lens elements 321, 322, 323, 324, 325 and the optical elements 3202, 3203, 3204, 3205, 3206 in the plastic lens barrel 300.

The second optical element assembly includes a first light blocking sheet 331, a first spacer 333, a second light blocking sheet 334, a second spacer 335, a third light blocking sheet 336 and a second retainer 332, wherein the first spacer 333 is adjacent to an image side of the first light blocking sheet 331, the second light blocking sheet 334 is adjacent to an image side of the first spacer 333, the second spacer 335 is adjacent to an image side of the second light blocking sheet 334, the third spacer 336 is adjacent to an image side of the second spacer 335 and is adjacent to an object side of the second retainer 332. The second retainer 332 is for positioning the second optical element assembly in the plastic lens barrel 300; in detail, the second retainer 332 is located on the image side of the second optical element assembly for positioning the first light blocking sheet 331, the first spacer 333 and the second light blocking sheet 334, the second spacer 335 and the third spacer 336 in the plastic lens barrel 300.

The plastic lens barrel 300 has an object-side hole 3001 facing towards an object side and an image-side hole 3002 facing towards an image side, and includes a protrusion portion 301, a first inner annular surface 302 and a second inner annular surface 303. The protrusion portion 301 extends towards the optical axis X along a direction Xp perpendicular to the optical axis X. The first inner annular surface 302 is connected to an object side of the protrusion portion 301 and the object-side hole 3001, and forms a first receiving space (its reference numeral is omitted). The second inner annular surface 303 is connected to an image side of the protrusion portion 301 and the image-side hole 3002, and forms a second receiving space (its reference numeral is omitted). The first optical element assembly is disposed in the first receiving space of the plastic lens barrel 300, and the second optical element assembly is disposed in the second receiving space of the plastic lens barrel 300; in particular, the first retainer 3201 is for positioning the first optical element assembly in the first receiving space, and the second retainer 332 is for positioning the second optical element assembly in the second receiving space.

The protrusion portion 301 is an annular-shaped which surrounds the optical axis X and forms a central hole 3012, and the central hole 3012 is located between the first receiving space and the second receiving space. The protrusion portion 301 includes a reverse inclined surface 3011, and the reverse inclined surface 3011 is a conical surface which is gradually enlarged from the central hole 3012 toward the image side. The second retainer 332 has an inner annular surface 3321, and an inner diameter of the inner annular surface 3321 is gradually enlarged from the object side toward the image side.

A maximum outer diameter of each of the optical lens elements 321, 322, 323, 324, 325 is larger than a minimum inner diameter of the central hole 3012, and all of the optical lens elements 321, 322, 323, 324, 325 are located on an object side of the central hole 3012. Moreover, the diameter of the central hole 3012 is smaller than a diameter of the object-side hole 3001 of the plastic lens barrel 300, and the diameter of the central hole 3012 is smaller than a diameter of the image-side hole 3002 of the plastic lens barrel 300.

An outer diameter of the first receiving space is gradually reduced from the object-side hole 3001 to the central hole 3012 along the optical axis X, and an outer diameter of the second receiving space is gradually reduced from the image-side hole 3002 to the central hole 3012 along the optical axis X.

Figure 3C:
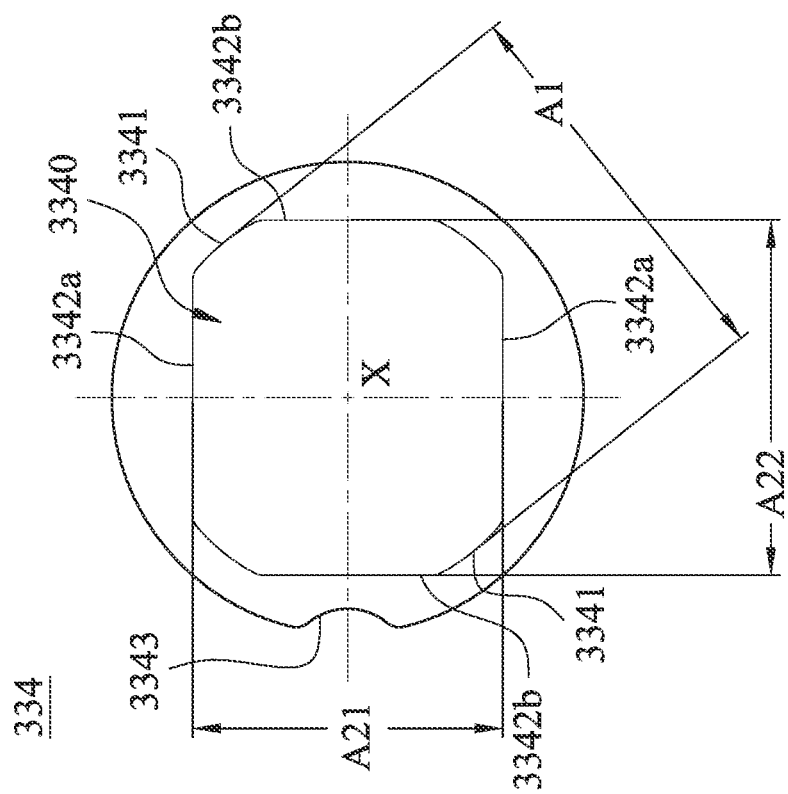
FIG. 3C is a schematic view of a second light blocking sheet according to the 3rd example of FIG. 3A.
Figure 3B:
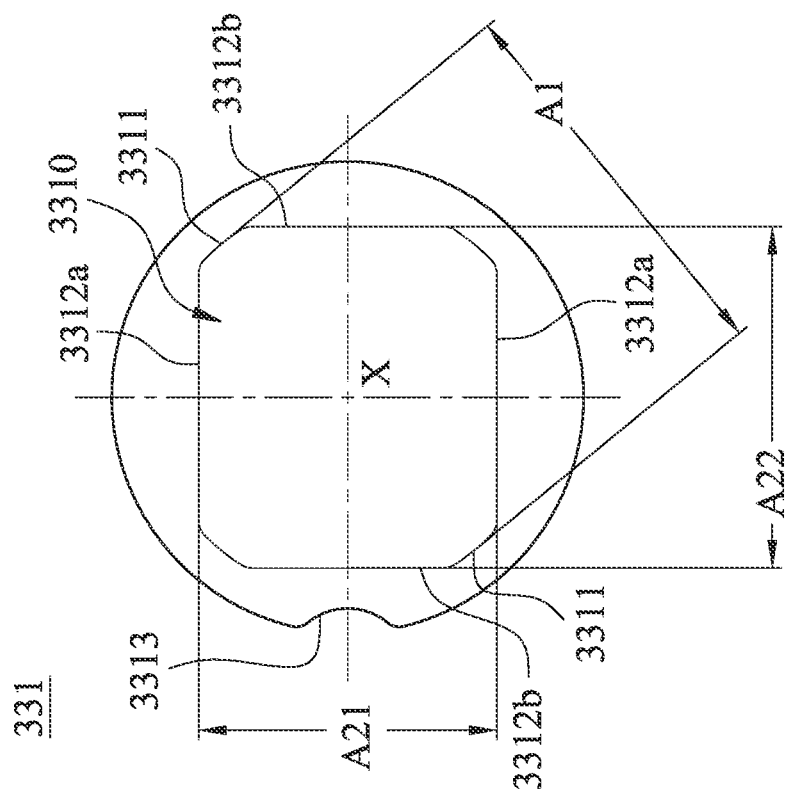
FIG. 3B is a schematic view of a first light blocking sheet according to the 3rd example of FIG. 3A.
Figure 3D:
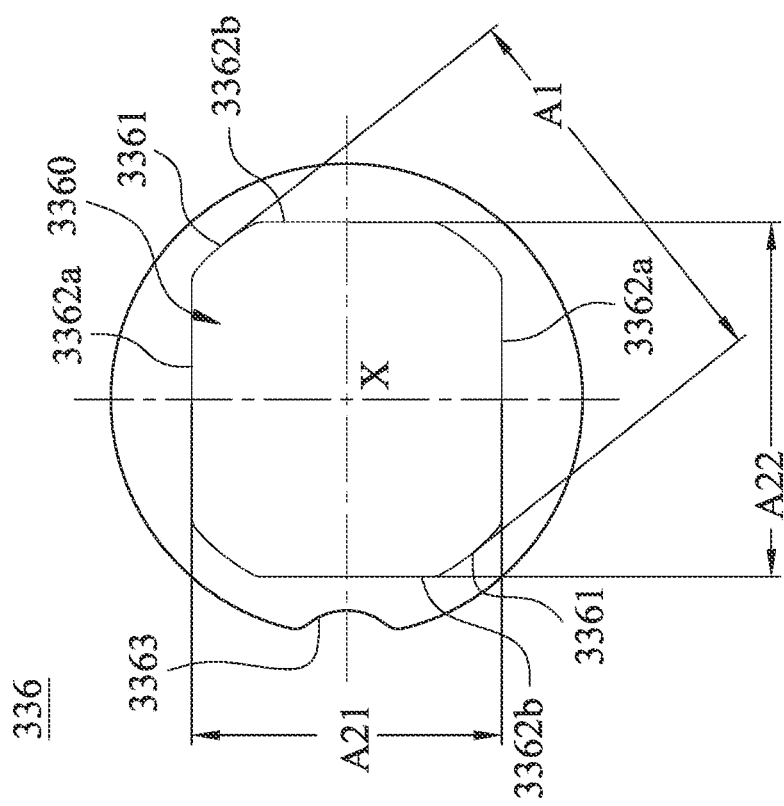
FIG. 3D is a schematic view of a third light blocking sheet according to the 3rd example of FIG. 3A.

FIG. 3B is a schematic view of the first light blocking sheet according to the 3rd example of FIG. 3A. FIG. 3C is a schematic view of a second light blocking sheet according to the 3rd example of FIG. 3A. FIG. 3D is a schematic view of a third light blocking sheet according to the 3rd example of FIG. 3A. In FIGS. 3B, 3C and 3D, the first light blocking sheet 331 can include a directional notch 3313, the second light blocking sheet 334 can include a directional notch 3343, the third light blocking sheet 336 can include a directional notch 3363, the plastic lens barrel 300 can further include a directional protrusion (not shown), the directional notches 3313, 3343, 3363 correspond to the directional protrusion and cooperate with each other, and the directional notches 3313, 3343, 3363 and the directional protrusion extend towards the optical axis X.

In FIG. 3B, the first light blocking sheet 331 has an inner hole 3310, and the inner hole 3310 includes a circular portion 3311 and rectangular portions 3312a, 3312b. The circular portion 3311 corresponds to a shape of the central hole 3012, and the rectangular portions 3312a, 3312b correspond to a shape of an image sensor (not shown). In particular, according to the 3rd example, a distance between the two circular portions 3311 relative to each other is A1, A1=3.200 mm, a distance between the two rectangular portions 3312a relative to each other is A21, A21=2.400 mm, and a distance between the two rectangular portions 3312b relative to each other is A22, A22=2.750 mm, wherein a minimum inner diameter of the first light blocking sheet 331 is the distance A21 relative two rectangular portions 3312a, the minimum inner diameter of the first light blocking sheet 331 is smaller than the minimum inner diameter of the central hole 3012.

In FIG. 3C, the second light blocking sheet 334 has an inner hole 3340, and the inner hole 3340 includes a circular portion 3341 and rectangular portions 3342a, 3342b. The circular portion 3341 corresponds to a shape of the central hole 3012, and the rectangular portions 3342a, 3342b correspond to a shape of the image sensor (not shown). In particular, according to the 3rd example, a distance between the two circular portions 3341 relative to each other is A1, A1=3.200 mm, a distance between the two rectangular portions 3342a is A21, A21=2.496 mm, and a distance between the two rectangular portions 3342b relative to each other is A22, A22=2.860 mm, wherein a minimum inner diameter of the second light blocking sheet 334 is the distance A21 relative two rectangular portions 3342a, the minimum inner diameter of the second light blocking sheet 334 is smaller than the minimum inner diameter of the central hole 3012.

In FIG. 3D, the third light blocking sheet 336 has an inner hole 3360, and the inner hole 3360 includes a circular portion 3361 and rectangular portions 3362a, 3362b. The circular portion 3361 corresponds to a shape of the central hole 3012, and the rectangular portions 3362a, 3362b correspond to a shape of the image sensor (not shown). In particular, according to the 3rd example, a distance between the two circular portions 3361 relative to each other is A1, A1=3.200 mm, a distance between the two rectangular portions 3362a relative to each other is A21, A21=2.496 mm, and a distance between the two rectangular portions 3342b relative to each other is A22, A22=2.860 mm, wherein a minimum inner diameter of the third light blocking sheet 336 is the distance A21 relative two rectangular portions 3362a, the minimum inner diameter of the third light blocking sheet 336 is smaller than the minimum inner diameter of the central hole 3012. Moreover, in 3rd example, the minimum inner diameter of one of the first light blocking sheet 331, the second light blocking sheet 334 and the third light blocking sheet 336 that is closer to the image side is larger than the minimum inner diameter of one of the object side; that is, the minimum inner diameter of the third light blocking sheet 336 is larger than the minimum inner diameter of the first light blocking sheet 331.

In FIG. 3A, when a length of the first inner annular surface 302 along the optical axis X is L1, a length of the second inner annular surface 303 along the optical axis X is L2, a shortest distance between the first retainer 3201 and the second retainer 332 along the optical axis X is D1, a shortest distance between the optical lens element 325 closest to the image-side hole in the first optical element assembly and the light blocking sheet (that is the third light blocking sheet 336) adjacent to the second retainer 332 in the second optical element assembly along the optical axis X is D2, and a number of the optical lens elements is N, the following conditions of Table 3 are satisfied, respectively.

TABLE 3

| the 3rd example | | | |
|---|---|---|---|
| L1 (mm) | 6.258 | D1 (mm) | 6.337 |
| L2 (mm) | 1.027 | D2 (mm) | 0.880 |
| L2/L1 | 0.164 | N | 5 |

Moreover, in the imaging lens module of the 3rd example, it can further include a light turning element (not shown) and an image surface (not shown). The arrangement can be the same as the light turning element 140 and the image surface 150 disclosed in the 1st example of FIG. 1A, and the image surface is also provided with the image sensor disposed thereon, and will not be described again.

4TH EXAMPLE

Figure 4A:
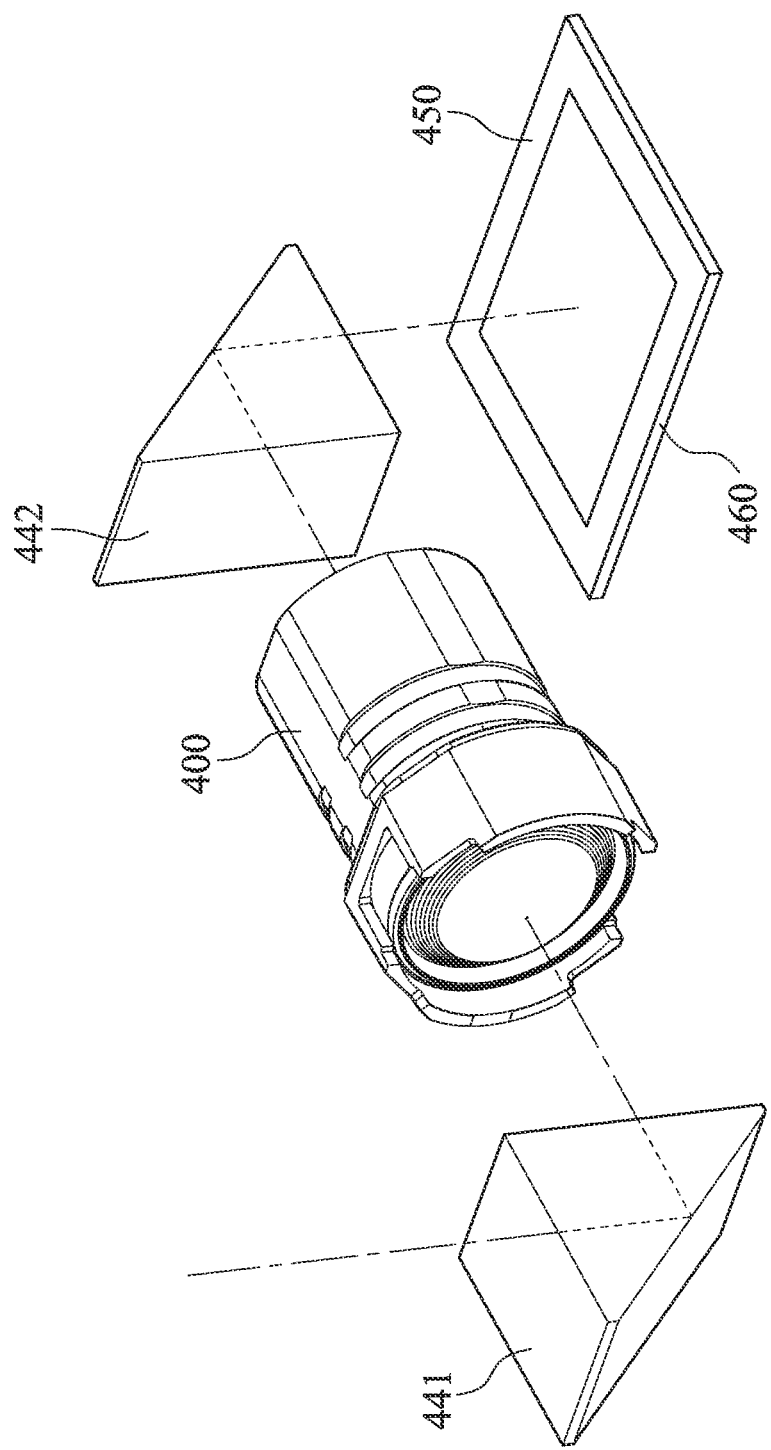
FIG. 4A is a schematic view of an imaging lens module according to the 4th example of the present disclosure.

FIG. 4A is a three-dimensional schematic view of an imaging lens module according to the 4th example of the present disclosure. In FIG. 4A, the imaging lens module includes, in order from an object side to an image side, a light turning element 441, a plastic lens barrel 400, a light turning element 442 and an image surface 450 from an object side to an image side, wherein the light turning elements 441, 442 are located on the object side and the image side of the plastic lens barrel 400 along the optical axis X, respectively. An image sensor 460 can be disposed on the image surface 450.

Figure 4B:
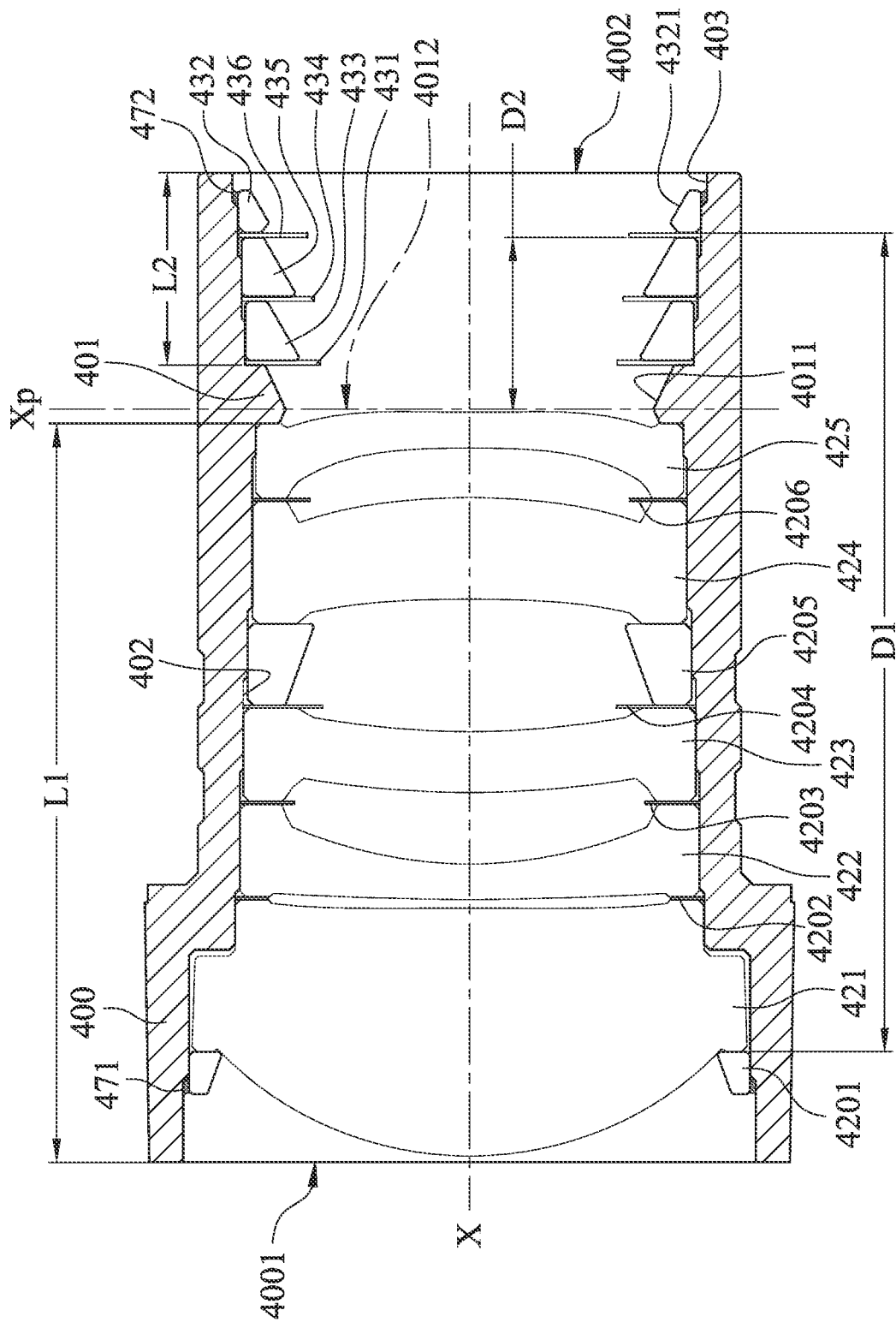
FIG. 4B is a schematic view of a plastic lens barrel, a first optical element assembly and a second optical element assembly of the imaging lens module according to the 4th example of the present disclosure.

FIG. 4B is a schematic view of a plastic lens barrel 400, a first optical element assembly and a second optical element assembly of the imaging lens module according to the 4th example of the present disclosure. In FIG. 4B, the imaging lens module includes the plastic lens barrel 400, the first optical element assembly (its reference numeral is omitted) and the second optical element assembly (its reference numeral is omitted), wherein all of the first optical element assembly and the second optical element assembly are disposed in the plastic lens barrel 400.

In detail, the first optical element assembly includes a plurality of optical lens elements 421, 422, 423, 424, 425 and a first retainer 4201. In the 4th example, the first optical element assembly further includes a plurality of optical elements 4202, 4203, 4204, 4205, 4206, wherein each of the optical elements 4202, 4203, 4204, 4206 is a light blocking sheet, and the optical element 4205 is a spacer. The first retainer 4201 is for positioning the first optical element assembly in the plastic lens barrel 400; in detail, the first retainer 4201 is located on the object side of the first optical element assembly for positioning the optical lens elements 421, 422, 423, 424, 425 and the optical elements 4202, 4203, 4204, 4205, 4206 in the plastic lens barrel 400.

The second optical element assembly includes a first light blocking sheet 431, a first spacer 433, a second light blocking sheet 434, a second spacer 435, a third light blocking sheet 436 and a second retainer 432, wherein the first spacer 433 is adjacent to an image side of the first light blocking sheet 431, the second light blocking sheet 434 is adjacent to an image side of the first spacer 433, the second spacer 435 is adjacent to an image side of the second light blocking sheet 434, the third spacer 436 is adjacent to an image side of the second spacer 435 and is adjacent to an object side of the second retainer 432. The second retainer 432 is for positioning the second optical element assembly in the plastic lens barrel 400; in detail, the second retainer 432 is located on the image side of the second optical element assembly for positioning the first light blocking sheet 431, the first spacer 433 and the second light blocking sheet 434, the second spacer 435 and the third spacer 436 in the plastic lens barrel 400.

The plastic lens barrel 400 has an object-side hole 4001 facing towards an object side and an image-side hole 4002 facing towards an image side, and includes a protrusion portion 401, a first inner annular surface 402 and a second inner annular surface 403. The protrusion portion 401 extends towards the optical axis X along a direction Xp perpendicular to the optical axis X. The first inner annular surface 402 is connected to an object side of the protrusion portion 401 and the object-side hole 4001, and forms a first receiving space (its reference numeral is omitted). The second inner annular surface 403 is connected to an image side of the protrusion portion 401 and the image-side hole 4002, and forms a second receiving space (its reference numeral is omitted). The first optical element assembly is disposed in the first receiving space of the plastic lens barrel 400, and the second optical element assembly is disposed in the second receiving space of the plastic lens barrel 400; in particular, the first retainer 4201 is for positioning the first optical element assembly in the first receiving space, and the second retainer 432 is for positioning the second optical element assembly in the second receiving space.

The protrusion portion 401 is an annular-shaped which surrounds the optical axis X and forms a central hole 4012, and the central hole 4012 is located between the first receiving space and the second receiving space. The protrusion portion 401 includes a reverse inclined surface 4011, and the reverse inclined surface 4011 is a conical surface which is gradually enlarged from the central hole 4012 toward the image side. The second retainer 432 has an inner annular surface 4321, and an inner diameter of the inner annular surface 4321 is gradually enlarged from the object side toward the image side.

A maximum outer diameter of each of the optical lens elements 421, 422, 423, 424, 425 is larger than a minimum inner diameter of the central hole 4012, and all of the optical lens elements 421, 422, 423, 424, 425 are located on an object side of the central hole 4012. Moreover, the diameter of the central hole 4012 is smaller than a diameter of the object-side hole 4001 of the plastic lens barrel 400, and the diameter of the central hole 4012 is smaller than a diameter of the image-side hole 4002 of the plastic lens barrel 400.

An outer diameter of the first receiving space is gradually reduced from the object-side hole 4001 to the central hole 4012 along the optical axis X, and an outer diameter of the second receiving space is gradually reduced from the image-side hole 4002 to the central hole 4012 along the optical axis X.

Figure 4D:
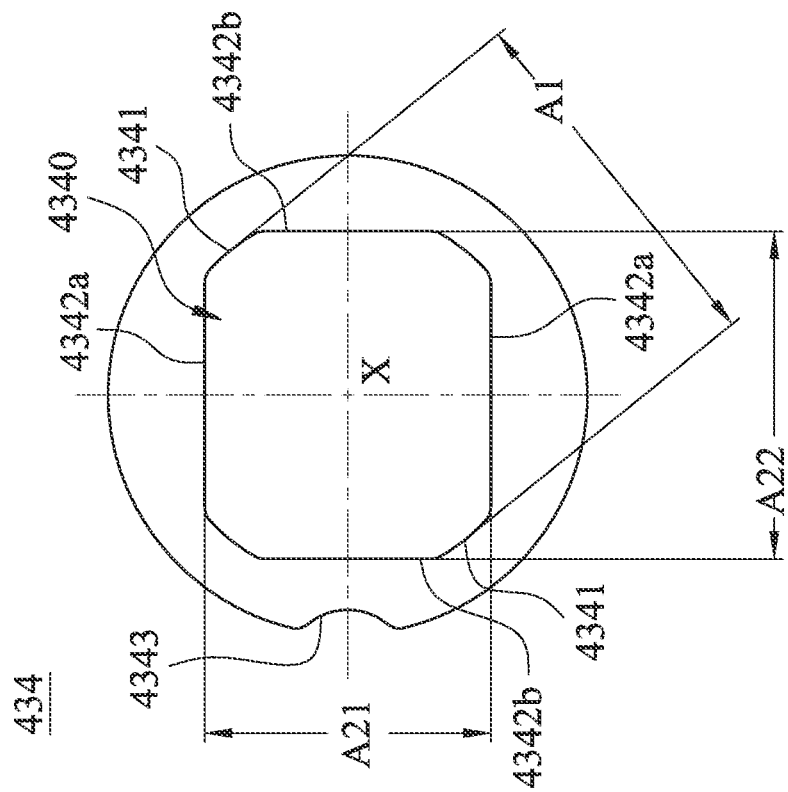
FIG. 4D is a schematic view of a second light blocking sheet according to the 4th example of FIG. 4B.
Figure 4C:
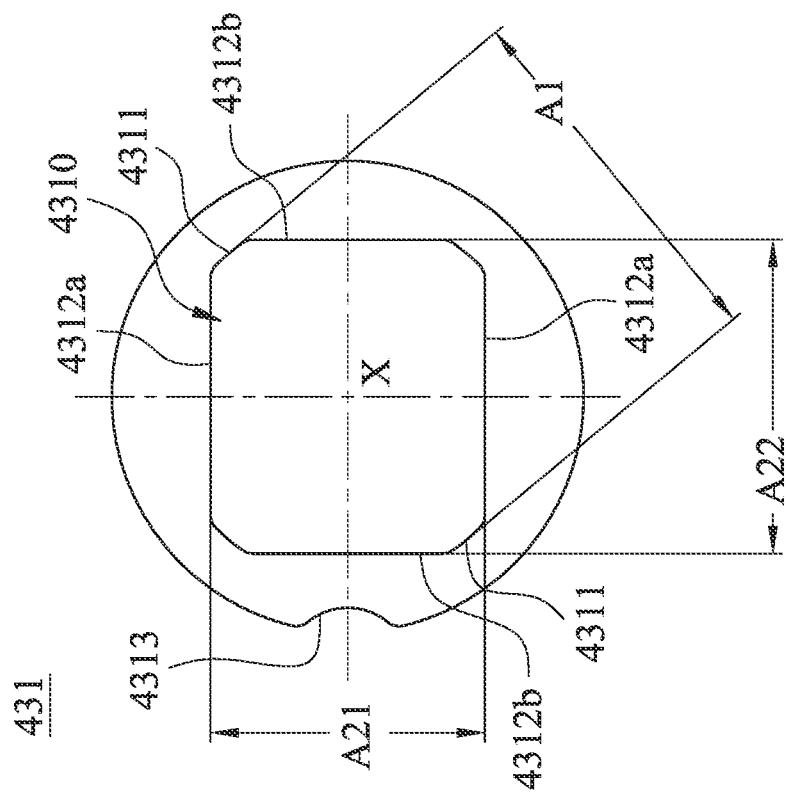
FIG. 4C is a schematic view of a first light blocking sheet according to the 4th example of FIG. 4B.
Figure 4E:
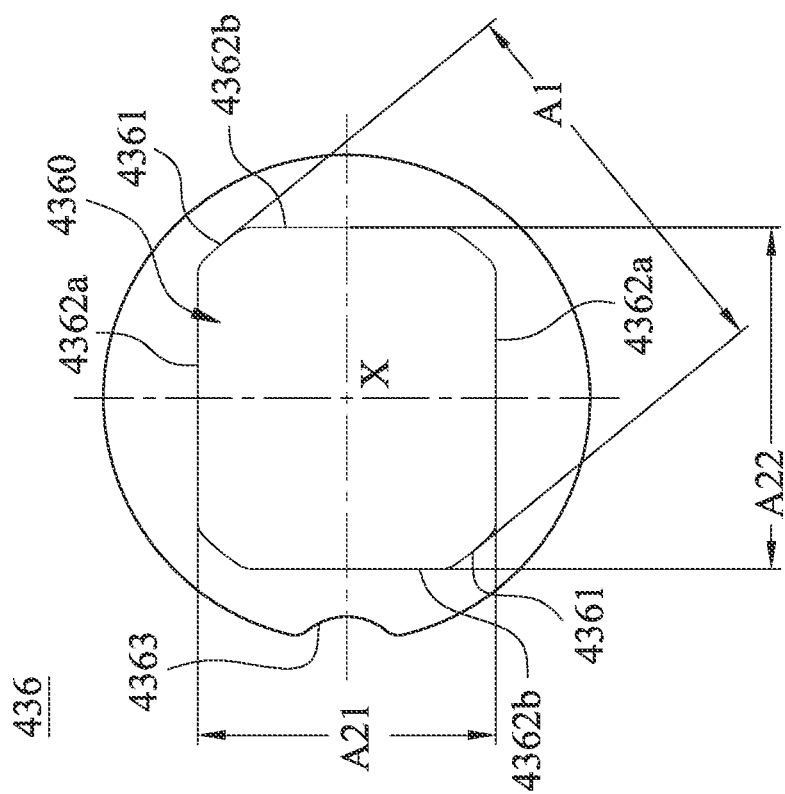
FIG. 4E is a schematic view of a third light blocking sheet according to the 4th example of FIG. 4B.

FIG. 4C is a schematic view of the first light blocking sheet 431 according to the 4th example of FIG. 4B. FIG. 4D is a schematic view of a second light blocking sheet 434 according to the 4th example of FIG. 4B. FIG. 4E is a schematic view of a third light blocking sheet 436 according to the 4th example of FIG. 4B. In FIGS. 4C, 4D and 4E, the first light blocking sheet 431 can include a directional notch 4313, the second light blocking sheet 434 can include a directional notch 4343, the third light blocking sheet 436 can include a directional notch 4363, the plastic lens barrel 400 can further include a directional protrusion (not shown), the directional notches 4313, 4343, 4363 correspond to the directional protrusion and cooperate with each other, and the directional notches 4313, 4343, 4363 and the directional protrusion extend towards the optical axis X.

In FIG. 4C, the first light blocking sheet 431 has an inner hole 4310, and the inner hole 4310 includes a circular portion 4311 and rectangular portions 4312a, 4312b. The circular portion 4311 corresponds to a shape of the central hole 4012, and the rectangular portions 4312a, 4312b correspond to a shape of the image sensor 460. In particular, according to the 4th example, a distance between the two circular portions 4311 relative to each other is A1, A1=3.000 mm, a distance between the two rectangular portions 4312a relative to each other is A21, A21=2.208 mm, and a distance between the two rectangular portions 4312b relative to each other is A22, A22=2.530 mm, wherein a minimum inner diameter of the first light blocking sheet 431 is the distance A21 relative two rectangular portions 4312a, the minimum inner diameter of the first light blocking sheet 431 is smaller than the minimum inner diameter of the central hole 4012.

In FIG. 4D, the second light blocking sheet 434 has an inner hole 4340, and the inner hole 4340 includes a circular portion 4341 and rectangular portions 4342a, 4342b. The circular portion 4341 corresponds to a shape of the central hole 4012, and the rectangular portions 4342a, 4342b correspond to a shape of the image sensor 460. In particular, according to the 4th example, a distance between the two circular portions 4341 relative to each other is A1, A1=3.000 mm, a distance between the two rectangular portions 4342a relative to each other is A21, A21=2.304 mm, and a distance between the two rectangular portions 4342b relative to each other is A22, A22=2.640 mm, wherein a minimum inner diameter of the second light blocking sheet 434 is the distance A21 relative two rectangular portions 4342a, the minimum inner diameter of the second light blocking sheet 434 is smaller than the minimum inner diameter of the central hole 4012.

In FIG. 4E, the third light blocking sheet 436 has an inner hole 4360, and the inner hole 4360 includes a circular portion 4361 and rectangular portions 4362a, 4362b. The circular portion 4361 corresponds to a shape of the central hole 4012, and the rectangular portions 4362a, 4362b correspond to a shape of the image sensor 460. In particular, according to the 4th example, a distance between the two circular portions 4361 is relative to each other A1, A1=3.200 mm, a distance between the two rectangular portions 4362a relative to each other is A21, A21=2.400 mm, and a distance between the two rectangular portions 4342b relative to each other is A22, A22=2.750 mm, wherein a minimum inner diameter of the third light blocking sheet 436 is the distance A21 relative two rectangular portions 4362a, the minimum inner diameter of the third light blocking sheet 436 is smaller than the minimum inner diameter of the central hole 4012. Moreover, in 4th example, the minimum inner diameter of one of the first light blocking sheet 431, the second light blocking sheet 434 and the third light blocking sheet 436 that is closer to the image side is larger than the minimum inner diameter of one of the object side; that is, the minimum inner diameter of the third light blocking sheet 436 is larger than the minimum inner diameter of the first light blocking sheet 431.

In FIG. 4B, when a length of the first inner annular surface 402 along the optical axis X is L1, and a length of the second inner annular surface 403 along the optical axis X is L2, a shortest distance between the first retainer 4201 and the second retainer 432 along the optical axis X is D1, a shortest distance between the optical lens element 425 closest to the image-side hole in the first optical element assembly and the light blocking sheet (that is the third light blocking sheet 436) adjacent to the second retainer 432 in the second optical element assembly along the optical axis X is D2, and a number of the optical lens elements is N, the following conditions of Table 4 are satisfied, respectively.

TABLE 4

| the 4th example | | | |
|---|---|---|---|
| L1 (mm) | 6.258 | D1 (mm) | 6.937 |
| L2 (mm) | 1.627 | D2 (mm) | 1.480 |
| L2/L1 | 0.260 | N | 5 |

Moreover, in FIG. 4B, the imaging lens module can further include a first receiving groove 471 and a second receiving groove 472, wherein the first receiving groove 471 is disposed between the plastic lens barrel 400 and the first retainer 4201, and the second receiving groove 472 is disposed between the plastic lens barrel 400 and the second retainer 432. Each of the first receiving groove 471 and the second receiving groove 472 is filled with a glue material (its reference numeral is omitted) for positioning the first retainer 4201 and the second retainer 432 in the plastic lens barrel 400, respectively.

5TH EXAMPLE

Figure 5A:
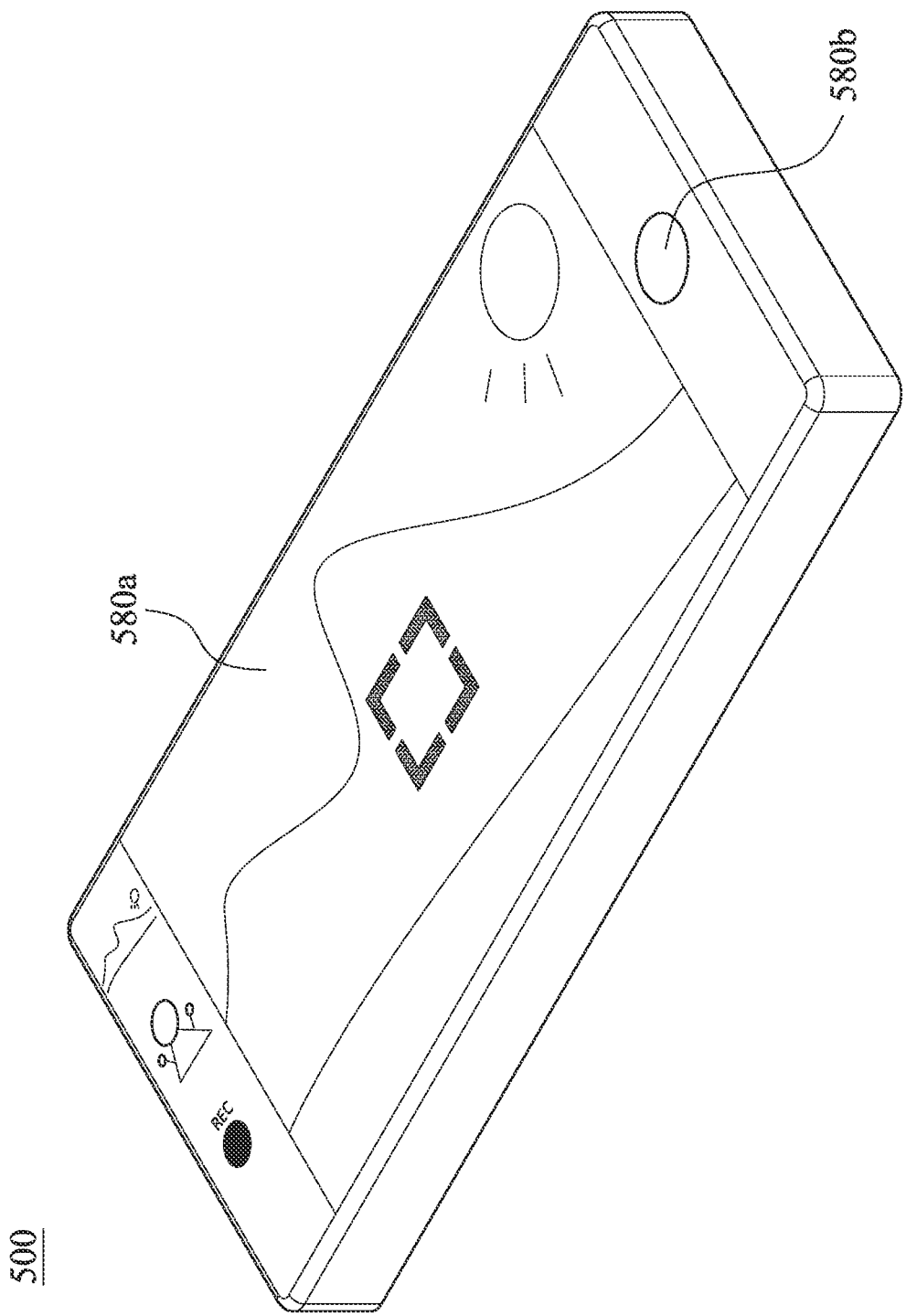
FIG. 5A is a schematic view of an appearance of an electronic device according to the 5th example of the present disclosure.
Figure 5B:
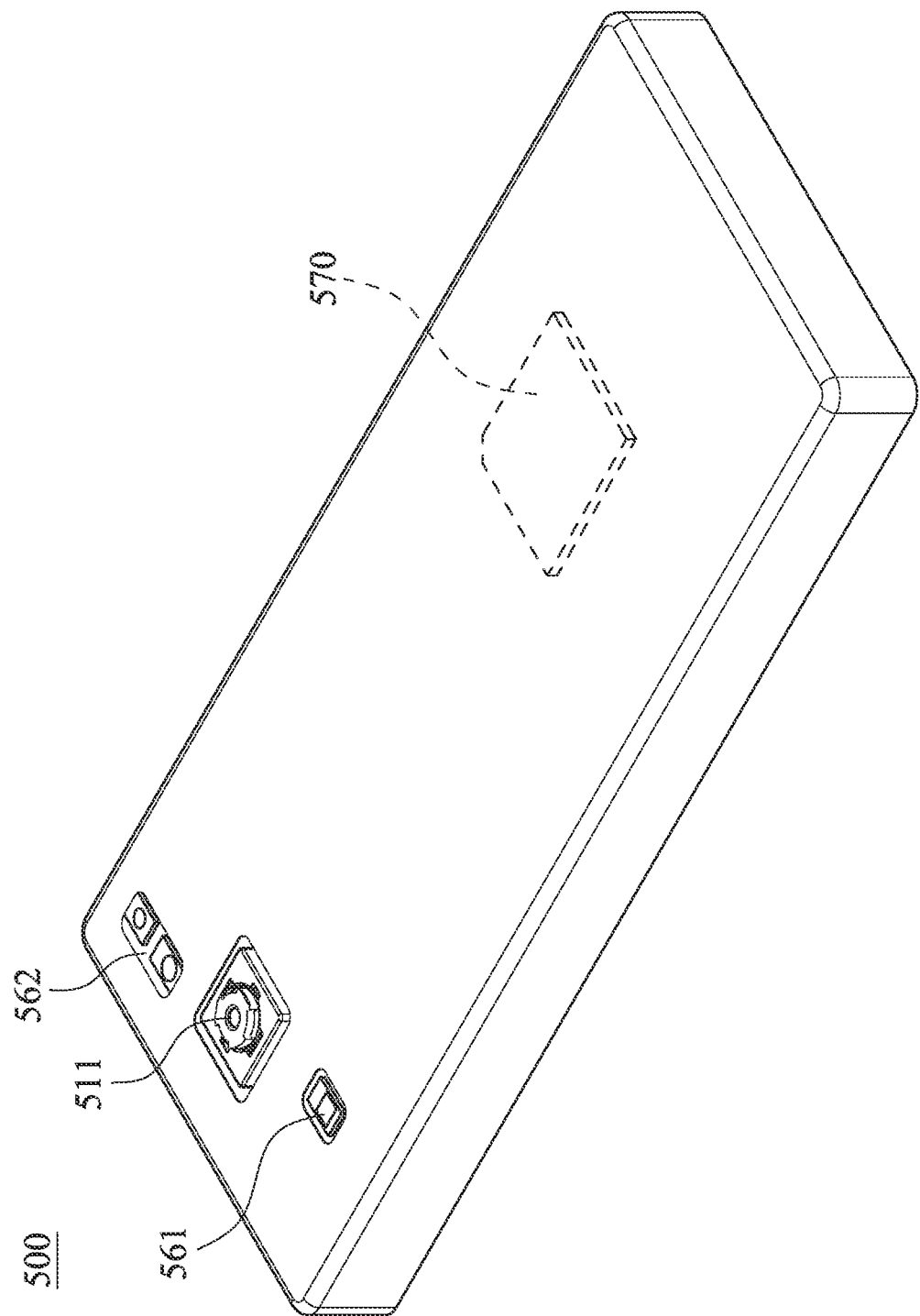
FIG. 5B is another schematic view of the appearance of the electronic device according to the 5th example of FIG. 5A.
Figure 5C:
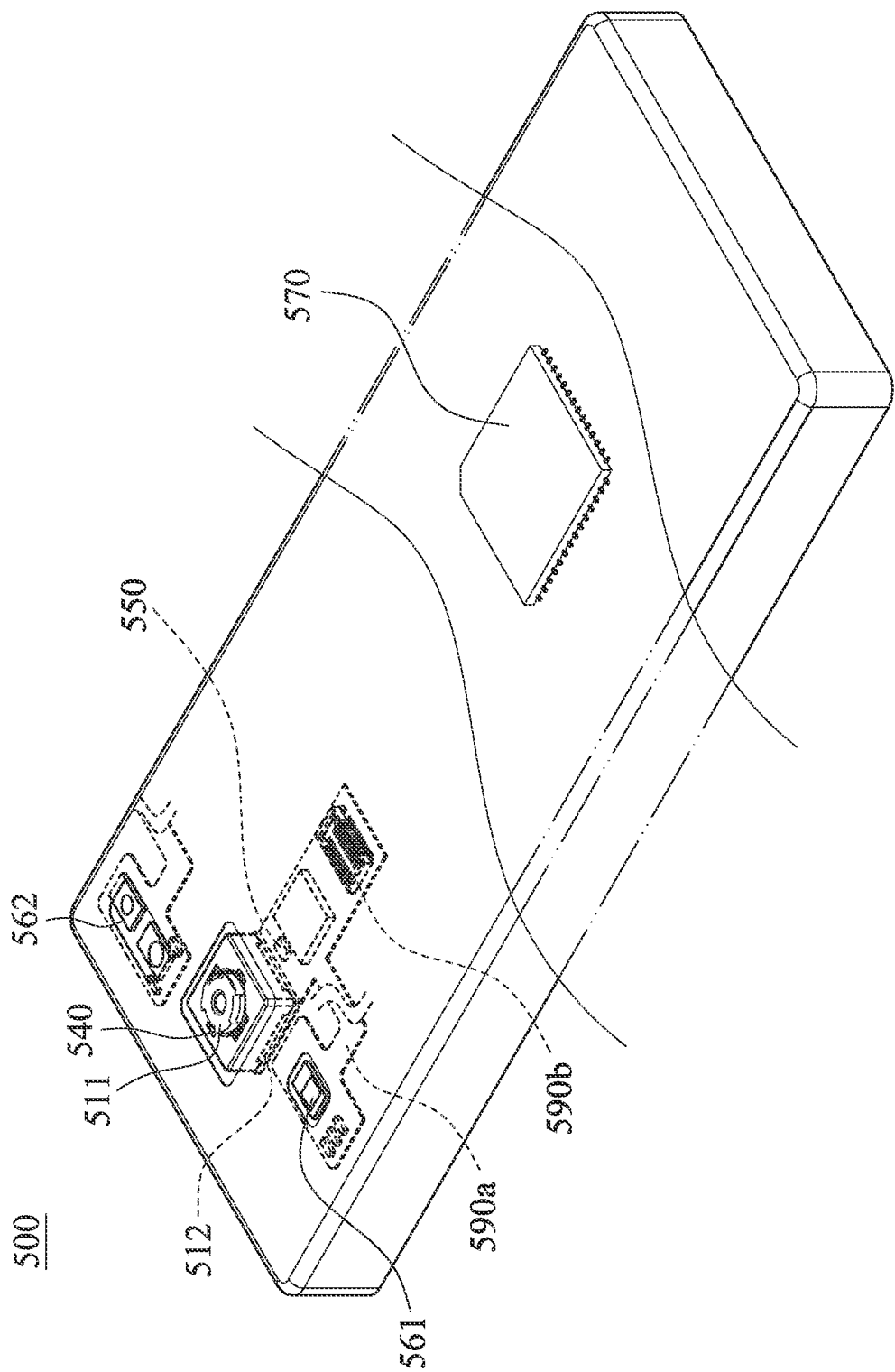
FIG. 5C is a schematic view of elements of the electronic device according to the 5th example of FIG. 5A.
Figure 5D:
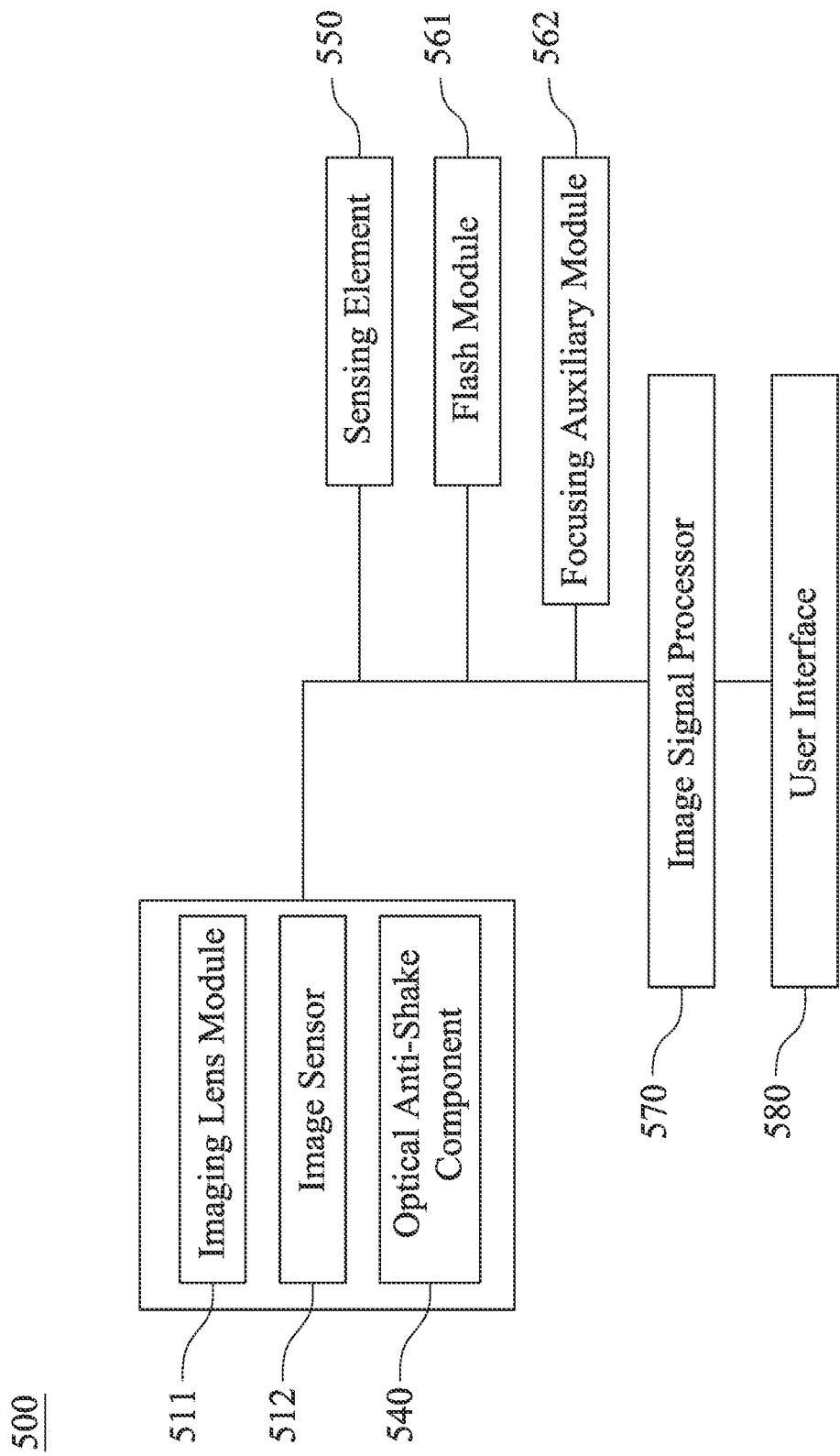
FIG. 5D is a block diagram of the electronic device according to the 5th example of FIG. 5A.

FIG. 5A is a schematic view of an appearance of an electronic device 500 according to the 5th example of the present disclosure. FIG. 5B is another schematic view of the appearance of the electronic device 500 according to the 5th example of FIG. 5A. FIG. 5C is a schematic view of elements of the electronic device 500 according to the 5th example of FIG. 5A. FIG. 5D is a block diagram of the electronic device 500 according to the 5th example of FIG. 5A. In FIGS. 5A, 5B, 5C and 5D, the electronic device 500 of the 5th example is a smart phone, and the electronic device 500 includes any one of an imaging lens module 511 in the foregoing examples and an image sensor 512, and the image sensor 512 is disposed on an image surface of the imaging lens module 511 (not shown), wherein the imaging lens module 511 mounted on the electronic device 500 is not limited to the present disclosure. Therefore, it is favorable for satisfying requirements of the mass production and appearance of the camera module applied to the electronic device nowadays.

Furthermore, the user enters the shooting mode through the user interface 580 of the electronic device 500, wherein the user interface of the 5th example can be a touch screen 580a, a button 580b, etc. At this time, the imaging lens module 511 collects the imaging light on the image sensor 512, and outputs an electronic signal about the image to an Image Signal Processor (ISP) 570.

In response to the camera specifications of the electronic device 500, the electronic device 500 may further include an optical anti-shake component 540, which can be an OIS anti-shake feedback device. Furthermore, the electronic device 500 can further include at least one auxiliary optical element (its reference numeral is omitted) and at least one sensing element 550. In the 5th example, the auxiliary optical element can be a flash module 561 and a focusing auxiliary module 562. The flash module 561 can compensate for color temperature, and the focusing auxiliary module 562 can be an infrared ranging component, a laser focusing module, etc. The sensing element 550 can have a function of sensing physical momentum and actuation energy, such as an accelerometer, a gyroscope, and a Hall Effect Element to sense the shaking and shaking applied by the user's hand or the external environment. Further, the autofocus function and the optical anti-shake component 540 configured by the camera module 510 in the electronic device 500 are facilitated to obtain good imaging quality, and the electronic device 500 according to the present disclosure has a plurality of modes of shooting functions, such as optimized self-timer, low light source HDR (High Dynamic Range imaging), high resolution 4K (4K Resolution) video. Moreover, the user can directly view the camera's shooting screen from the touch screen and manually operate the viewing range on the touch screen to achieve the autofocus function of what you see is what you get.

Moreover, in FIG. 5C, the imaging lens module 511, the optical anti-shake component 540, the sensing element 550, the flash module 561 and the focusing auxiliary module 562 can be disposed on a Flexible Printed Circuit Board (FPC) 590a and electrically connected to the imaging signal processing component 570 through the connector 590b to execute the photographing process. The current electronic devices, such as smart phones, have a thin and light trend. The camera module and related components are arranged on a flexible circuit board, and then the circuit is integrated into the main board of the electronic device by using a connector, which can meet the limited space of the mechanism design and the circuit layout requirements, and the greater margin is achieved, and the autofocus function of the imaging lens is more flexibly controlled by the touch screen of the electronic device. In other embodiments (not shown), the sensing element and the auxiliary optical element can also be disposed on the main board of the electronic device or other forms of the carrier according to the mechanism design and the circuit layout requirements.

Furthermore, the electronic device 500 can further include, but is not limited to, a display unit, a control unit, a storage unit, a Random Access Memory unit (RAM), a Read-Only Memory unit (ROM), or a combination thereof.

6TH EXAMPLE

Figure 6A:
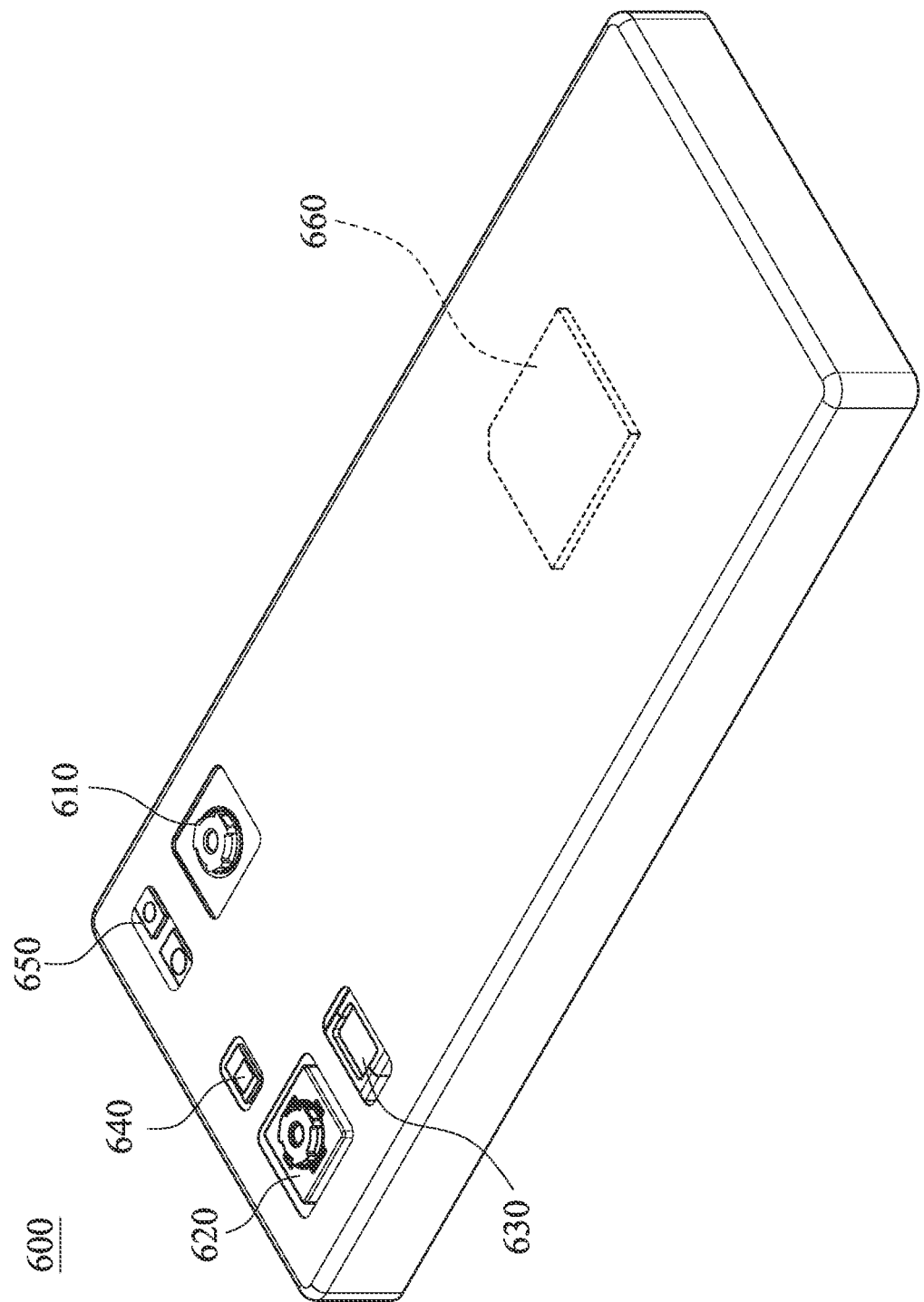
FIG. 6A is a schematic view of an electronic device according to the 6th example of the present disclosure.
Figure 6B:
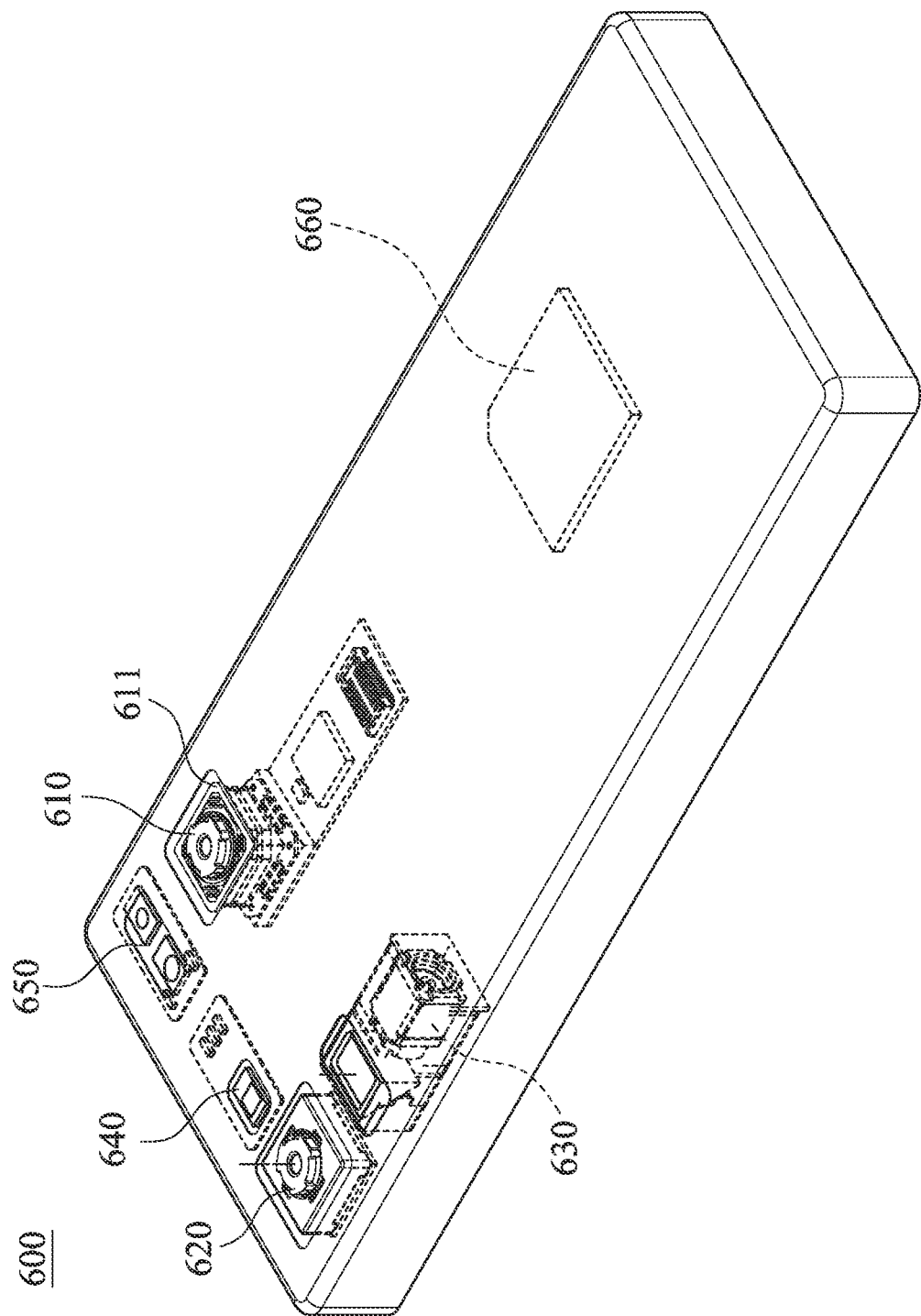
FIG. 6B is a perspective view of the electronic device according to the 6th example of FIG. 6A.

FIG. 6A is a schematic view of an electronic device 600 according to the 6th example of the present disclosure. FIG. 6B is a perspective view of the electronic device 600 according to the 6th example of FIG. 6A. In FIGS. 6A and 6B, the electronic device 600 of the 6th example is a smart phone, and the electronic device 600 includes three imaging lens modules 610, 620, 630, a flash module 640, a focusing auxiliary module 650, an image signal processor 660, a user interface (not shown) and an image software processor (not shown), wherein the imaging lens modules 610, 620, 630 face toward a same side (and face toward an object-side). When the user shoots the subject through the user interface, the electronic device 600 collects the image by using the imaging lens modules 610, 620, 630. The user switches on the flash module 640 to fill the light, and the subject is quickly focused by using the object distance information which is provided from the focusing auxiliary module 650, plus the image signal processor 660 and the image software processor optimize the image. Furthermore, the image quality produced by the optical lens assembly in the imaging lens modules 610, 620, 630 is further improved. The focusing auxiliary module 650 can use infrared or laser focusing auxiliary system to achieve quick focusing, and the user interface can adopt a touch screen or a physical shooting button to perform image capturing and image processing with various functions of the image processing software.

In the 6th example, the imaging lens modules 610, 620, 630 can include any one of the imaging lens modules in the 1st to the 4th foregoing examples, but it is not limited thereto.

Moreover, in the 6th example, an optical anti-shake component 611 is disposed on the outside of the imaging lens module 610, which can be an OIS anti-shake feedback device. The image capturing device 630 is a telescope head, but the disclosure is not limited thereto.

7TH EXAMPLE

Figure 7:
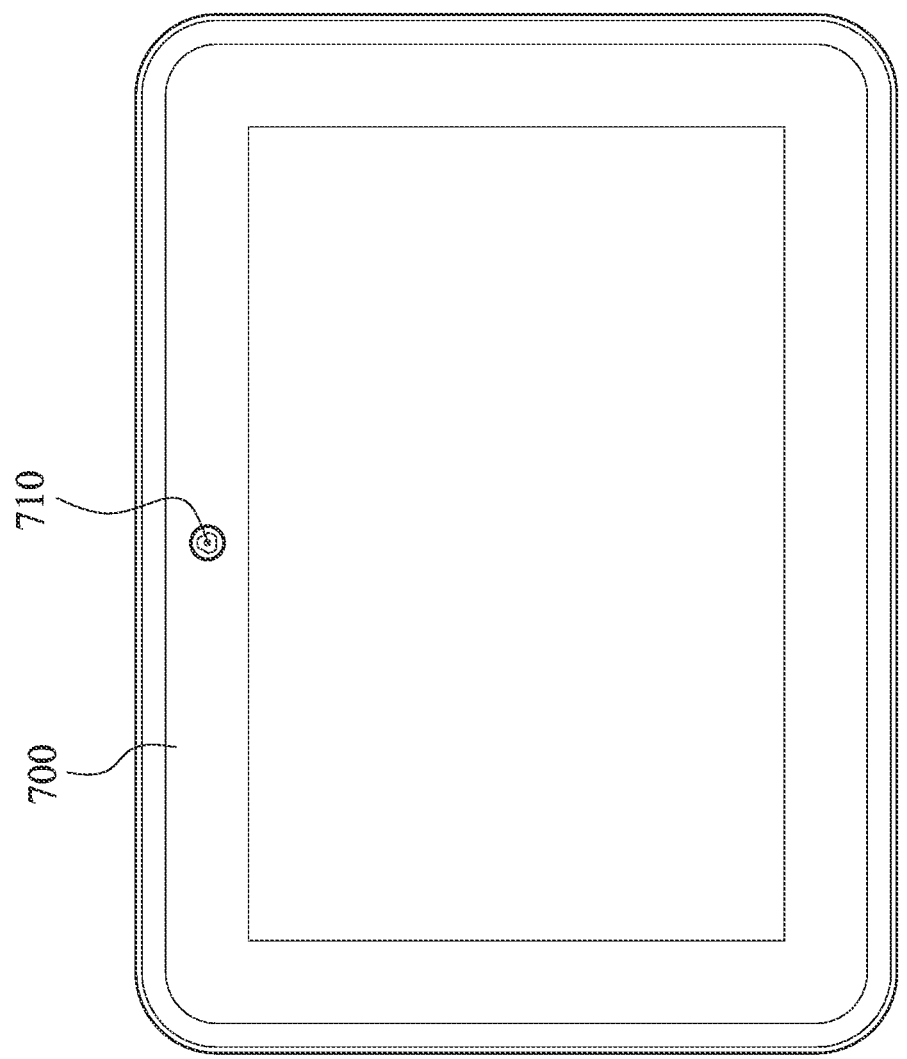
FIG. 7 is a schematic view of an electronic device according to the 7th example of the present disclosure.

FIG. 7 is a schematic view of an electronic device 700 according to the 7th example of the present disclosure. The electronic device 700 of the 7th example is a tablet. The electronic device 700 includes an imaging lens module 710 and an image sensor (not shown) according to the present disclosure, wherein the image sensor is disposed on an image surface (not shown) of the imaging lens module 710.

8TH EXAMPLE

Figure 8:
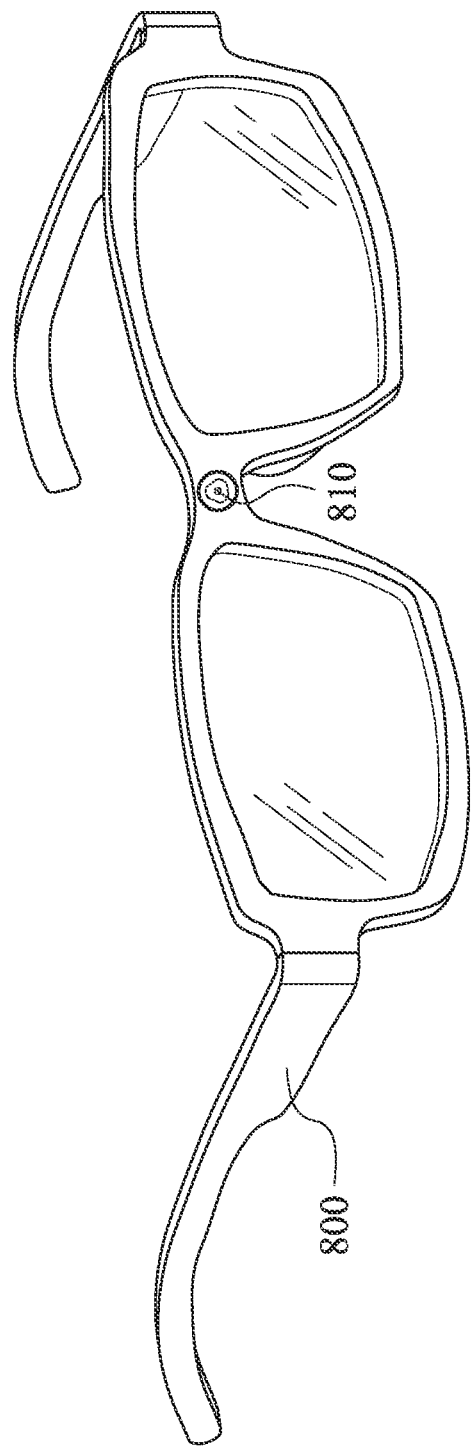
FIG. 8 is a schematic view of an electronic device according to the 8th example of the present disclosure.

FIG. 8 is a schematic view of an electronic device 800 according to the 8th example of the present disclosure. The electronic device 800 of the 8th example is a wearable device. The electronic device 800 includes an imaging lens module 810 and an image sensor (not shown) according to the present disclosure, wherein the image sensor is disposed on an image surface (not shown) of the imaging lens module 810.

The foregoing description, for purpose of explanation, has been described with reference to specific embodiments and examples. The embodiments and examples were chosen and described in order to best explain the principles of the disclosure and its practical applications, to thereby enable others skilled in the art to best utilize the disclosure and various embodiments and examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, which has an optical axis, comprising:
   a plastic lens barrel having an object-side hole facing towards an object side and an image-side hole facing towards an image side, and comprising:
   a protrusion portion extending towards the optical axis along a direction perpendicular to the optical axis;
   a first inner annular surface connected to an object side of the protrusion portion and the object-side hole, and forming a first receiving space; and
   a second inner annular surface connected to an image side of the protrusion portion and the image-side hole, and forming a second receiving space;
   a first optical element assembly disposed in the first receiving space, and comprising:
   a plurality of optical lens elements; and
   a second optical element assembly disposed in the second receiving space, and comprising:
   a first light blocking sheet;
   wherein the protrusion portion is an annular-shaped which surrounds the optical axis and forms a central hole, the central hole is located between the first receiving space and the second receiving space;
   wherein a maximum outer diameter of each of the optical lens elements is larger than a minimum inner diameter of the central hole, and all of the optical lens elements which are received in the plastic lens barrel are located on an object side of the central hole;
   wherein a minimum inner diameter of the first light blocking sheet is smaller than the minimum inner diameter of the central hole.

2. The imaging lens module of claim 1, wherein the minimum inner diameter of the central hole is smaller than a diameter of the object-side hole of the plastic lens barrel, and the minimum inner diameter of the central hole is smaller than a diameter of the image-side hole of the plastic lens barrel.

3. The imaging lens module of claim 2, wherein an outer diameter of the first receiving space is gradually reduced from the object-side hole to the central hole along the optical axis, and an outer diameter of the second receiving space is gradually reduced from the image-side hole to the central hole along the optical axis.

4. The imaging lens module of claim 1, further comprising:
   an image surface located on an image side of the plastic lens barrel, and an image sensor disposed thereon, wherein the first light blocking sheet has an inner hole, the inner hole comprises a circular portion and a rectangular portion, the circular portion corresponds to a shape of the central hole, and the rectangular portion corresponds to a shape of the image sensor.

5. The imaging lens module of claim 1, wherein the first light blocking sheet comprises a directional notch, the plastic lens barrel further comprises a directional protrusion, the directional notch corresponds to the directional protrusion and cooperates with each other, and the directional notch and the directional protrusion extend towards the optical axis.

6. The imaging lens module of claim 1, wherein the second optical element assembly further comprises a second light blocking sheet and a first spacer, the first spacer is adjacent to an image side of the first light blocking sheet, and the second light blocking sheet is adjacent to an image side of the first spacer.

7. The imaging lens module of claim 6, wherein the second optical element assembly further comprises a third light blocking sheet and a second spacer, the second spacer is adjacent to an image side of the second light blocking sheet, and the third light blocking sheet is adjacent to an image side of the second spacer.

8. The imaging lens module of claim 7, wherein a minimum inner diameter of one of the first light blocking sheet, the second light blocking sheet and the third light blocking sheet which is closer to the image side is larger than which is closer to the object side.

9. The imaging lens module of claim 1, wherein the protrusion portion comprises a reverse inclined surface, the reverse inclined surface is a conical surface which is gradually enlarged from the central hole toward the image side.

10. The imaging lens module of claim 9, wherein the second optical element assembly further comprises a second retainer for positioning the second optical element assembly in the second receiving space, and the second retainer has an inner annular surface, an inner diameter of the inner annular surface is gradually enlarged from the object side toward the image side.

11. The imaging lens module of claim 1, wherein the first optical element assembly further comprises a first retainer for positioning the first optical element assembly in the first receiving space, and the second optical element assembly further comprises a second retainer for positioning the second optical element assembly in the second receiving space;
   wherein the imaging lens module further comprises:
   a first receiving groove disposed between the plastic lens barrel and the first retainer; and
   a second receiving groove disposed between the plastic lens barrel and the second retainer;
   wherein each of the first receiving groove and the second receiving groove is filled with a glue material for fixing the first retainer and the second retainer in the plastic lens barrel, respectively.

12. The imaging lens module of claim 1, wherein a length of the first inner annular surface along the optical axis is L1, a length of the second inner annular surface along the optical axis is L2, and the following condition is satisfied:

0.05<L2/L1<0.50.

13. The imaging lens module of claim 1, wherein the first optical element assembly further comprises a first retainer for positioning the first optical element assembly in the first receiving space, and the second optical element assembly further comprises a second retainer for positioning the second optical element assembly in the second receiving space;

wherein a shortest distance between the first retainer and the second retainer along the optical axis is D1, and the following condition is satisfied:

3.5 mm<D1<8.0 mm.

14. The imaging lens module of claim 1, wherein the second optical element assembly further comprises a second retainer for positioning the second optical element assembly in the second receiving space;

wherein a shortest distance between the optical lens element closest to the image-side hole in the first optical element assembly and a light blocking sheet adjacent to the second retainer in the second optical element assembly along the optical axis is D2, and the following condition is satisfied:

0.2 mm<D2<2.0 mm.

15. The imaging lens module of claim 6, wherein the second optical element assembly further comprises a second retainer for positioning the second optical element assembly in the second receiving space;

wherein a shortest distance between the optical lens element closest to the image-side hole in the first optical element assembly and a light blocking sheet adjacent to the second retainer in the second optical element assembly along the optical axis is D2, and the following condition is satisfied:

0.2 mm<D2<2.0 mm.

16. The imaging lens module of claim 7, wherein the second optical element assembly further comprises a second retainer for positioning the second optical element assembly in the second receiving space;

wherein a shortest distance between the optical lens element closest to the image-side hole in the first optical element assembly and a light blocking sheet adjacent to the second retainer in the second optical element assembly along the optical axis is D2, and the following condition is satisfied:

0.2 mm<D2<2.0 mm.

17. The imaging lens module of claim 1, wherein a number of the optical lens elements is N, and the following condition is satisfied:

4≤N<10.

18. The imaging lens module of claim 17, wherein a composite focal length of the plurality of optical lens elements is equal to an effective focal length of the imaging lens module.

19. The imaging lens module of claim 1, further comprising:

an optical-path folding element disposed on the object side of the imaging lens module.

20. An electronic device, comprising:
the imaging lens module of claim 1; and
an image sensor disposed on an image surface of the imaging lens module.

* * * * *